US012279314B2

(12) United States Patent
Pantelidou et al.

(10) Patent No.: US 12,279,314 B2
(45) Date of Patent: Apr. 15, 2025

(54) APPARATUS, METHOD AND COMPUTER PROGRAM FOR SENDING RANDOM ACCESS CHANNEL INFORMATION

(71) Applicant: Nokia Technologies Oy, Espoo (FI)

(72) Inventors: Anna Pantelidou, Antony (FR); Hakon Helmers, Sceaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 446 days.

(21) Appl. No.: 17/790,837

(22) PCT Filed: Dec. 2, 2020

(86) PCT No.: PCT/EP2020/084282
§ 371 (c)(1),
(2) Date: Jul. 5, 2022

(87) PCT Pub. No.: WO2021/144062
PCT Pub. Date: Jul. 22, 2021

(65) Prior Publication Data
US 2023/0043737 A1 Feb. 9, 2023

Related U.S. Application Data

(60) Provisional application No. 63/027,861, filed on May 20, 2020.

(30) Foreign Application Priority Data

Jan. 17, 2020 (GB) ..................... 2000697

(51) Int. Cl.
*H04W 74/0833* (2024.01)
*H04W 24/04* (2009.01)

(52) U.S. Cl.
CPC ....... *H04W 74/0833* (2013.01); *H04W 24/04* (2013.01)

(58) Field of Classification Search
CPC ............ H04W 74/0833; H04W 24/04; H04W 74/004; H04W 74/08; H04W 24/10; H04W 74/002; H04W 76/10
See application file for complete search history.

(56) References Cited

U.S. PATENT DOCUMENTS 9,380,605 B1    6/2016 Lee et al.
2011/0051609 A1 3/2011 Ishii et al.
(Continued)

FOREIGN PATENT DOCUMENTS

CN    107926034 A    4/2018
CN    110753324 A    2/2020
(Continued)

OTHER PUBLICATIONS

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.
(Continued)

*Primary Examiner* — Afshawn M Towfighi
(74) *Attorney, Agent, or Firm* — Robert P. Michal, Esq.; Carter, DeLuca & Farrell LLP

(57) ABSTRACT

An apparatus comprising means for performing: determining information comprising: a rate of failure for random access channel attempts in at least one cell controlled by the apparatus; and/or a number of successful random access channel attempts in the at least one cell controlled by the apparatus and a number of failed random access channel
(Continued)

attempts in the at least one cell controlled by the apparatus; and sending the information from the apparatus to a second apparatus.

1 Claim, 10 Drawing Sheets

(56) References Cited

U.S. PATENT DOCUMENTS

| | | | |
|---|---|---|---|
| 2015/0063313 A1* | 3/2015 | Kanamarlapudi | H04W 36/16 370/332 |
| 2015/0249930 A1* | 9/2015 | Andrianov | H04W 24/02 455/423 |
| 2015/0282107 A1* | 10/2015 | Vrind | H04W 76/19 370/252 |
| 2016/0381715 A1 | 12/2016 | Lee et al. | |
| 2019/0037631 A1 | 1/2019 | Byun et al. | |
| 2019/0053120 A1* | 2/2019 | Park | H04W 36/305 |

FOREIGN PATENT DOCUMENTS

| | | |
|---|---|---|
| EP | 2949145 A1 | 12/2015 |
| JP | 2009-055356 A | 3/2009 |
| JP | 2010-199823 A | 9/2010 |
| JP | 2013-201502 A | 10/2013 |
| JP | 2019-525599 A | 9/2019 |
| WO | 2013/085242 A1 | 6/2013 |
| WO | 2014/114346 A1 | 7/2014 |

OTHER PUBLICATIONS

"3rd Generation Partnership Project; Technical Specification Group Radio Access Network; NG-RAN; Xn application protocol (XnAP) (Release 15)", 3GPP TS 38.423, V15.5.0, Sep. 2019, pp. 1-311.

"3rd Generation Partnership Project; Technical Specification Group Radio Access Network; NG-RAN; F1 application protocol (F1AP) (Release 15)", 3GPP TS 38.473, V15.7.0, Sep. 2019, pp. 1-221.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.7.0, Sep. 2019, pp. 1-365.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.7.0, Sep. 2019, pp. 1-962.

"3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.

"(TP for SON BL CR for TS 38.473): RACH report for RACH Optimization", 3GPP TSG-RAN3 Meeting #106, R3-196883, Agenda: 10.2.3.1, Huawei, Nov. 18-22, 2019, 7 pages.

"3rd Generation Partnership Project; Technical Specification Group Radio Access Network; NG-RAN; Architecture description (Release 16)", 3GPP TS 38.401, V16.0.0, Dec. 2019, pp. 1-49.

"3rd Generation Partnership Project; Technical Specification Group Radio Access Network; NG-RAN; E1 general aspects and principles (Release 16)", 3GPP TS 38.460, V16.0.0, Dec. 2019, pp. 1-10.

"3rd Generation Partnership Project; Technical Specification Group Radio Access Network; NG-RAN; E1 Application Protocol (E1AP) (Release 16)", 3GPP TS 38.463, V16.0.0, Dec. 2019, pp. 1-190.

"3rd Generation Partnership Project; Technical Specification Group Radio Access Network; NG-RAN; F1 general aspects and principles (Release 16)", 3GPP TS 38.470, V16.0.0, Dec. 2019, pp. 1-13.

"3rd Generation Partnership Project; Technical Specification Group Radio Access Network; NG-RAN; Ng Application Protocol (NGAP) (Release 16)", 3GPP TS 38.413, V16.0.0, Dec. 2019, pp. 1-335.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.8.0, Dec. 2019, pp. 1-134.

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

"Reply LS on RACH Optimization and Mobility Robustness Optimization", 3GPP TSG-RAN3 Meeting #106, R3-196409, RAN2, Nov. 18-22, 2019, pp. 1-2.

Search Report received for corresponding United Kingdom Patent Application No. 2000697.9, dated May 6, 2020, 4 pages.

International Search Report and Written Opinion received for corresponding Patent Cooperation Treaty Application No. PCT/EP2020/084282, dated Feb. 5, 2021, 11 pages.

"Discussion of RACH optimization in Nr", 3GPP TSG-RAN3 Meeting #103, R3-190379, Agenda: 25.2.3, Huawei, Feb. 25-Mar. 1, 2019, 3 pages.

Decision of Final Rejection received for corresponding Japanese Patent Application No. 2022-543450, dated Feb. 19, 2024, (2 pages), English Summary (3 pages), 5 pages total.

Office action received for corresponding Chinese Patent Application No. 202080098606.7, dated Jun. 24, 2024, 7 pages of office action and no page of translation available.

Office action received for corresponding Indian Patent Application No. 202247046535, dated Nov. 22, 2022, 6 pages.

Office action received for corresponding Japanese Patent Application No. 2022-543450, dated Sep. 4, 2023, 3 pages of office action and 2 pages of summary available.

"Further discussion on RACH optimization", 3GPP TSG-RAN WG3 Meeting #106, R3-196845, Agenda: 10.2.3.1, Nokia, Nov. 18-22, 2019, 3 pages.

"RACH Assistance Information Exchange", 3GPP TSG-RAN WG3 Meeting #107-e, R3-200385, Agenda: 10.2.3.2, Nokia, Feb. 24-Mar. 6, 2020, 3 pages.

* cited by examiner

APPARATUS, METHOD AND COMPUTER PROGRAM FOR SENDING RANDOM ACCESS CHANNEL INFORMATION

RELATED APPLICATION

This application was originally filed as PCT Application No. PCT/EP2020/084282, filed on Dec. 2, 2020, which claims priority from GB Application No. 2000697.9, filed on Jan. 17, 2020, and U.S. Provisional Application No. 63/027,861, filed on May 20, 2020, each of which is incorporated herein by reference in its entirety.

FIELD

This disclosure relates to wireless communications. Some examples relate to Random Access Channel (RACH) procedures.

BACKGROUND

In some wireless networks, such as Long Term Evolution (LTE) or Fifth Generation (5G) networks for example, a User Equipment (UE) may try to connect to an Access Node using a Random Access Channel (RACH) procedure.

In some networks, such as 5G networks for example, an Access Node such as a gNB may have a functional internal split into a Centralized Unit (CU) and at least one Decentralized Unit (DU).

STATEMENT OF INVENTION

According to a first aspect there is provided an apparatus comprising means for performing: determining information comprising a rate of failure for random access channel attempts in at least one cell controlled by the apparatus; and sending the information from the apparatus to a second apparatus.

According to an example the means are further configured to perform: receiving, from the second apparatus, a message comprising a rate of failure for random access channel attempts in at least one other cell in the network.

According to an example, the at least one other cell in the network is not controlled by the apparatus.

According to an example, the message comprising the rate of failure for random access channel attempts in at least one other cell in the network comprises an aggregate rate of failure for two or more other cells in the network.

According to an example, the message comprising rate of failure for random access channel attempts in at least one other cell in the network is received over an F1 interface.

According to an example, the determining information comprising the rate of failure for random access channel attempts in the at least one cell controlled by the apparatus is based on: determining a ratio of failed random access channel attempts in the at least one cell controlled by the apparatus to a total number of random access channel attempts in the at least one cell controlled by the apparatus, wherein the total number of random access channel attempts in the at least one cell controlled by the apparatus is determined as a sum of: a number of failed random access channel attempts in the at least one cell controlled by the apparatus; and a number of successful random access channel attempts in the at least one cell controlled by the apparatus.

According to an example, the apparatus comprises means for performing: counting the number of successful random access channel attempts in the at least one cell controlled by the apparatus.

According to an example, the means are configured to perform: receiving, from the second apparatus, information of random access channel reports related to random access channel attempts in the at least one cell controlled by the apparatus; determining, based on the information of random access channel reports related to random access channel attempts in the at least one cell controlled by the apparatus received from the second apparatus, a value indicating failed random access channel attempts in the at least one cell controlled by the apparatus.

According to an example, the rate of failure for random access channel attempts in at least one cell controlled by the apparatus is determined when the number of failed random access channel attempts in the at least one cell controlled by the apparatus exceeds a threshold value.

According to an example, the information of random access channel reports related to random access channel attempts in the at least one cell controlled by the apparatus is associated to a User Equipment.

According to an example, the information of random access channel reports related to random access channel attempts in the at least one cell controlled by the apparatus is associated to a User Equipment by using UE context information.

According to an example, the means are further configured to perform: comparing the information comprising a rate of failure for random access channel attempts in at least one cell controlled by the apparatus with the rate of failure for random access channel attempts in at least one other cell in the network; and determining to change a random access channel configuration of the apparatus based on the comparison.

According to an example, the means are further configured to perform determining to change a physical random access channel configuration of the apparatus based on the comparison.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-DU.

According to an example, the second apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-CU.

According to a second aspect there is provided an apparatus comprising at least one processor; and at least one memory including computer program code; the at least one memory and the computer program code configured to, with the at least one processor, cause the apparatus at least to perform: determining information comprising a rate of failure for random access channel attempts in at least one cell controlled by the apparatus; and sending the information from the apparatus to a second apparatus.

According to an example, the at least one memory and the computer program code are configured to, with the at least one processor, cause the apparatus at least to perform: receiving, from the second apparatus, a message comprising a rate of failure for random access channel attempts in at least one other cell in the network.

According to an example, the at least one other cell in the network is not controlled by the apparatus.

According to an example, the message comprising the rate of failure for random access channel attempts in at least one other cell in the network comprises an aggregate rate of failure for two or more other cells in the network.

According to an example, the message comprising rate of failure for random access channel attempts in at least one other cell in the network is received over an F1 interface.

According to an example, the determining information comprising the rate of failure for random access channel attempts in the at least one cell controlled by the apparatus is based on: determining a ratio of failed random access channel attempts in the at least one cell controlled by the apparatus to a total number of random access channel attempts in the at least one cell controlled by the apparatus, wherein the total number of random access channel attempts in the at least one cell controlled by the apparatus is determined as a sum of: a number of failed random access channel attempts in the at least one cell controlled by the apparatus; and a number of successful random access channel attempts in the at least one cell controlled by the apparatus.

According to an example, the at least one memory and the computer program code are configured to, with the at least one processor, cause the apparatus at least to perform: counting the number of successful random access channel attempts in the at least one cell controlled by the apparatus.

According to an example, the at least one memory and the computer program code are configured to, with the at least one processor, cause the apparatus at least to perform: receiving, from the second apparatus, information of random access channel reports related to random access channel attempts in the at least one cell controlled by the apparatus; determining, based on the information of random access channel reports related to random access channel attempts in the at least one cell controlled by the apparatus received from the second apparatus, a value indicating failed random access channel attempts in the at least one cell controlled by the apparatus.

According to an example, the rate of failure for random access channel attempts in at least one cell controlled by the apparatus is determined when the number of failed random access channel attempts in the at least one cell controlled by the apparatus exceeds a threshold value.

According to an example, the information of random access channel reports related to random access channel attempts in the at least one cell controlled by the apparatus is associated to a User Equipment.

According to an example, the information of random access channel reports related to random access channel attempts in the at least one cell controlled by the apparatus is associated to a User Equipment by using UE context information.

According to an example, the at least one memory and the computer program code are configured to, with the at least one processor, cause the apparatus at least to perform: comparing the information comprising a rate of failure for random access channel attempts in at least one cell controlled by the apparatus with the rate of failure for random access channel attempts in at least one other cell in the network; and determining to change a random access channel configuration of the apparatus based on the comparison.

According to an example, the at least one memory and the computer program code are configured to, with the at least one processor, cause the apparatus at least to perform: determining to change a physical random access channel configuration of the apparatus based on the comparison.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-DU.

According to an example, the second apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-CU.

According to a third aspect there is provided an apparatus comprising: circuitry for determining information comprising a rate of failure for random access channel attempts in at least one cell controlled by the apparatus; and circuitry for sending the information from the apparatus to a second apparatus.

According to a fourth aspect there is provided a method comprising: determining information comprising a rate of failure for random access channel attempts in at least one cell controlled by an apparatus; and sending the information from the apparatus to a second apparatus.

According to an example, the method comprises: receiving, from the second apparatus, a message comprising a rate of failure for random access channel attempts in at least one other cell in the network.

According to an example, the at least one other cell in the network is not controlled by the apparatus.

According to an example, the message comprising the rate of failure for random access channel attempts in at least one other cell in the network comprises an aggregate rate of failure for two or more other cells in the network.

According to an example, the message comprising rate of failure for random access channel attempts in at least one other cell in the network is received over an F1 interface.

According to an example, the determining information comprising the rate of failure for random access channel attempts in the at least one cell controlled by the apparatus is based on: determining a ratio of failed random access channel attempts in the at least one cell controlled by the apparatus to a total number of random access channel attempts in the at least one cell controlled by the apparatus, wherein the total number of random access channel attempts in the at least one cell controlled by the apparatus is determined as a sum of: a number of failed random access channel attempts in the at least one cell controlled by the apparatus; and a number of successful random access channel attempts in the at least one cell controlled by the apparatus.

According to an example, the apparatus comprises means for performing: counting the number of successful random access channel attempts in the at least one cell controlled by the apparatus.

According to an example, the method comprises: receiving, from the second apparatus, information of random access channel reports related to random access channel attempts in the at least one cell controlled by the apparatus; determining, based on the information of random access channel reports related to random access channel attempts in the at least one cell controlled by the apparatus received from the second apparatus, a value indicating failed random access channel attempts in the at least one cell.

According to an example, wherein the rate of failure for random access channel attempts in at least one cell controlled by the apparatus is determined when the number of failed random access channel attempts in the at least one cell controlled by the apparatus exceeds a threshold value.

According to an example, the information of random access channel reports related to random access channel attempts in the at least one cell controlled by the apparatus is associated to a User Equipment.

According to an example, the information of random access channel reports related to random access channel attempts in the at least one cell controlled by the apparatus is associated to a User Equipment by using UE context information.

According to an example, the method comprises: comparing the information comprising a rate of failure for random access channel attempts in at least one cell controlled by the apparatus with the rate of failure for random access channel attempts in at least one other cell in the network; and determining to change a random access channel configuration of the apparatus based on the comparison.

According to an example, the means are further configured to perform determining to change a physical random access channel configuration of the apparatus based on the comparison.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the method is performed by a gNB-DU.

According to an example, the second apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-CU.

According to a fifth aspect there is provided a computer program comprising instructions for causing an apparatus to perform at least the following: determining information comprising a rate of failure for random access channel attempts in at least one cell controlled by the apparatus; and sending the information from the apparatus to a second apparatus.

According to a sixth aspect there is provided a computer program comprising instructions stored thereon for performing at least the following: determining information comprising a rate of failure for random access channel attempts in at least one cell controlled by an apparatus; and sending the information from the apparatus to a second apparatus.

According to a seventh aspect there is provided a non-transitory computer readable medium comprising program instructions for causing an apparatus to perform at least the following: determining information comprising a rate of failure for random access channel attempts in at least one cell controlled by the apparatus; and sending the information from the apparatus to a second apparatus.

According to an eighth aspect there is provided a non-transitory computer readable medium comprising program instructions stored thereon for performing at least the following: determining information comprising a rate of failure for random access channel attempts in at least one cell controlled by an apparatus; and sending the information from the apparatus to a second apparatus.

According to a ninth aspect there is provided an apparatus comprising means for performing: receiving information comprising a rate of failure for random access channel attempts in at least one cell controlled by a second apparatus; and sending the information from the apparatus to a network entity.

According to an example, the network entity comprises at least one of: an Access Node; a decentralized unit of an Access Node; a centralized unit of an Access Node.

According to an example, the information comprising rate of failure for random access channel attempts in at least one other cell in the network is received over an F1 interface.

According to an example, the information further comprises random access channel reports, and wherein the means are further configured to perform: filtering the random access channel reports to contain information regarding random access channel reports for cells controlled by a third apparatus; sending the filtered random access channel reports to the third apparatus.

According to an example, the third apparatus may comprise an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the third apparatus may comprise a gNB-DU.

According to an example, the information of random access channel reports related to random access channel attempts in the at least one cell controlled by the second apparatus is associated to a User Equipment.

According to an example, the information of random access channel reports related to random access channel attempts in the at least one cell controlled by the apparatus is associated to a User Equipment by using UE context information.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-CU.

According to an example, the apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-DU.

According to a tenth aspect there is provided an apparatus comprising at least one processor; and at least one memory including computer program code; the at least one memory and the computer program code configured to, with the at least one processor, cause the apparatus at least to perform: receiving information comprising a rate of failure for random access channel attempts in at least one cell controlled by a second apparatus; and sending the information from the apparatus to a network entity.

According to an example, the network entity comprises at least one of: an Access Node; a decentralized unit of an Access Node; a centralized unit of an Access Node.

According to an example, the information comprising rate of failure for random access channel attempts in at least one other cell in the network is received over an F1 interface.

According to an example, the information further comprises random access channel reports, and wherein the at least one memory and the computer program code are configured to, with the at least one processor, cause the apparatus at least to perform: filtering the random access channel reports to contain information regarding random access channel reports for cells controlled by a third apparatus; sending the filtered random access channel reports to the third apparatus.

According to an example, the third apparatus may comprise an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the third apparatus may comprise a gNB-DU.

According to an example, the information of random access channel reports related to random access channel attempts in the at least one cell controlled by the second apparatus is associated to a User Equipment.

According to an example, the information of random access channel reports related to random access channel attempts in the at least one cell controlled by the apparatus is associated to a User Equipment by using UE context information.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-CU.

According to an example, the apparatus comprises an Access Node.

According to an example, the second apparatus comprises a gNB-DU.

According to an eleventh aspect there is provided an apparatus comprising: circuitry for receiving information comprising a rate of failure for random access channel attempts in at least one cell controlled by a second apparatus; and circuitry for sending the information from the apparatus to a network entity.

According to a twelfth aspect there is provided a method comprising: receiving information comprising a rate of failure for random access channel attempts in at least one cell controlled by an apparatus; and sending the information to a network entity.

According to an example, the network entity comprises at least one of: an Access Node; a decentralized unit; a centralized unit of an Access Node.

According to an example, the information comprising rate of failure for random access channel attempts in at least one other cell in the network is received over an F1 interface.

According to an example, the information further comprises random access channel reports, and the method comprises: filtering the random access channel reports to contain information regarding random access channel reports for cells controlled by a second apparatus; sending the filtered random access channel reports to the second apparatus.

According to an example, the information of random access channel reports related to random access channel attempts in the at least one cell controlled by the second apparatus is associated to a User Equipment.

According to an example, the information of random access channel reports related to random access channel attempts in the at least one cell controlled by the apparatus is associated to a User Equipment by using UE context information.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the method is performed by a gNB-CU.

According to an example, the method is performed by an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the apparatus comprises a gNB-DU.

According to an example, the second apparatus may comprise an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus may comprise a gNB-DU.

According to a thirteenth aspect there is provided a computer program comprising instructions for causing an apparatus to perform at least the following: receiving information comprising a rate of failure for random access channel attempts in at least one cell controlled by the apparatus; and sending the information to a network entity.

According to a fourteenth aspect there is provided a computer program comprising instructions stored thereon for performing at least the following: receiving information comprising a rate of failure for random access channel attempts in at least one cell controlled by an apparatus; and sending the information to a network entity.

According to a fifteenth aspect there is provided a non-transitory computer readable medium comprising program instructions for causing an apparatus to perform at least the following: receiving information comprising a rate of failure for random access channel attempts in at least one cell controlled by the apparatus; and sending the information to a network entity.

According to a sixteenth aspect there is provided a non-transitory computer readable medium comprising program instructions stored thereon for performing at least the following: receiving information comprising a rate of failure for random access channel attempts in at least one cell controlled by an apparatus; and sending the information to a network entity.

According to a seventeenth aspect there is provided an apparatus comprising means for performing: determining information comprising: a rate of failure for random access channel attempts in at least one cell controlled by the apparatus; and/or a number of successful random access channel attempts in the at least one cell controlled by the apparatus and a number of failed random access channel attempts in the at least one cell controlled by the apparatus and sending the information from the apparatus to a second apparatus.

According to an example the means are further configured to perform: receiving, from the second apparatus, a message comprising a rate of failure for random access channel attempts in at least one other cell.

According to an example, the at least one other cell in the network is not controlled by the apparatus.

According to an example, the message comprises the rate of failure for random access channel attempts in at least one other cell in the network and comprises an aggregate rate of failure for two or more other cells in the network.

According to an example, the message comprising rate of failure for random access channel attempts in at least one other cell in the network is received over an F1 interface.

According to an example, the determining the information comprises determining the rate of failure for random access channel attempts in the at least one cell controlled by the apparatus and is based on: determining a ratio of failed random access channel attempts in the at least one cell controlled by the apparatus to a total number of random access channel attempts in the at least one cell controlled by the apparatus, wherein the total number of random access channel attempts in the at least one cell controlled by the apparatus is determined as a sum of: the number of failed random access channel attempts in the at least one cell controlled by the apparatus; and a number of successful random access channel attempts in the at least one cell controlled by the apparatus.

According to an example, the apparatus comprises means for performing: counting the number of successful random access channel attempts in the at least one cell controlled by the apparatus.

According to an example, the means are configured to perform: receiving, from the second apparatus, information of random access channel reports related to random access channel attempts in the at least one cell controlled by the apparatus; determining, based on the information of random access channel reports related to random access channel attempts in the at least one cell controlled by the apparatus received from the second apparatus, a value indicating the number of failed random access channel attempts in the at least one cell controlled by the apparatus.

According to an example, the rate of failure for random access channel attempts in at least one cell controlled by the apparatus is determined when the number of failed random access channel attempts in the at least one cell controlled by the apparatus exceeds a threshold value.

According to an example, the information of random access channel reports related to random access channel attempts in the at least one cell controlled by the apparatus is associated to a User Equipment.

According to an example, the information of random access channel reports related to random access channel attempts in the at least one cell controlled by the apparatus is associated to a User Equipment by using UE context information.

According to an example, the means are further configured to perform: comparing the information comprising a rate of failure for random access channel attempts in at least one cell controlled by the apparatus with the rate of failure for random access channel attempts in at least one other cell; and determining to change a random access channel configuration of the apparatus based on the comparison.

According to an example, the means are further configured to perform determining to change a physical random access channel configuration of the apparatus based on the comparison.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-DU.

According to an example, the second apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-CU.

According to an eighteenth aspect there is provided an apparatus comprising at least one processor; and at least one memory including computer program code; the at least one memory and the computer program code configured to, with the at least one processor, cause the apparatus at least to perform: determining information comprising: a rate of failure for random access channel attempts in at least one cell controlled by the apparatus; and/or a number of successful random access channel attempts in the at least one cell controlled by the apparatus and a number of failed random access channel attempts in the at least one cell controlled by the apparatus; and sending the information from the apparatus to a second apparatus.

According to an example, the at least one memory and the computer program code are configured to, with the at least one processor, cause the apparatus at least to perform: receiving, from the second apparatus, a message comprising a rate of failure for random access channel attempts in at least one other cell in the network.

According to an example, the at least one other cell in the network is not controlled by the apparatus.

According to an example, the message comprising the rate of failure for random access channel attempts in at least one other cell in the network comprises an aggregate rate of failure for two or more other cells in the network.

According to an example, the message comprising rate of failure for random access channel attempts in at least one other cell in the network is received over an F1 interface.

According to an example, the determining the information comprises determining the rate of failure for random access channel attempts in the at least one cell controlled by the apparatus and is based on: determining a ratio of failed random access channel attempts in the at least one cell controlled by the apparatus to a total number of random access channel attempts in the at least one cell controlled by the apparatus, wherein the total number of random access channel attempts in the at least one cell controlled by the apparatus is determined as a sum of: the number of failed random access channel attempts in the at least one cell controlled by the apparatus; and the number of successful random access channel attempts in the at least one cell controlled by the apparatus.

According to an example, the at least one memory and the computer program code are configured to, with the at least one processor, cause the apparatus at least to perform: counting the number of successful random access channel attempts in the at least one cell controlled by the apparatus.

According to an example, the at least one memory and the computer program code are configured to, with the at least one processor, cause the apparatus at least to perform: receiving, from the second apparatus, information of random access channel reports related to random access channel attempts in the at least one cell controlled by the apparatus; determining, based on the information of random access channel reports related to random access channel attempts in the at least one cell controlled by the apparatus received from the second apparatus, a value indicating the number of failed random access channel attempts in the at least one cell controlled by the apparatus.

According to an example, the rate of failure for random access channel attempts in at least one cell controlled by the apparatus is determined when the number of failed random access channel attempts in the at least one cell controlled by the apparatus exceeds a threshold value.

According to an example, the information of random access channel reports related to random access channel attempts in the at least one cell controlled by the apparatus is associated to a User Equipment.

According to an example, the information of random access channel reports related to random access channel attempts in the at least one cell controlled by the apparatus is associated to a User Equipment by using UE context information.

According to an example, the at least one memory and the computer program code are configured to, with the at least one processor, cause the apparatus at least to perform: comparing the information comprising a rate of failure for random access channel attempts in at least one cell controlled by the apparatus with the rate of failure for random access channel attempts in at least one other cell; and determining to change a random access channel configuration of the apparatus based on the comparison.

According to an example, the at least one memory and the computer program code are configured to, with the at least one processor, cause the apparatus at least to perform: determining to change a physical random access channel configuration of the apparatus based on the comparison.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-DU.

According to an example, the second apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-CU.

According to a nineteenth aspect there is provided an apparatus comprising: circuitry for determining information comprising: a rate of failure for random access channel attempts in at least one cell controlled by the apparatus; and/or a number of successful random access channel attempts in the at least one cell controlled by the apparatus and a number of failed random access channel attempts in the at least one cell controlled by the apparatus; and circuitry for sending the information from the apparatus to a second apparatus.

According to a further aspect there is provided a method comprising: determining information comprising: a rate of failure for random access channel attempts in at least one cell controlled by an apparatus; and/or a number of successful random access channel attempts in the at least one cell controlled by the apparatus and a number of failed random access channel attempts in the at least one cell controlled by the apparatus; and sending the information from the apparatus to a second apparatus.

According to an example, the method comprises: receiving, from the second apparatus, a message comprising a rate of failure for random access channel attempts in at least one other cell.

According to an example, the at least one other cell in the network is not controlled by the apparatus.

According to an example, the message comprising the rate of failure for random access channel attempts in at least one other cell in the network comprises an aggregate rate of failure for two or more other cells in the network.

According to an example, the message comprising rate of failure for random access channel attempts in at least one other cell in the network is received over an F1 interface.

According to an example, the determining the information comprising the rate of failure for random access channel attempts in the at least one cell controlled by the apparatus and is based on: determining a ratio of failed random access channel attempts in the at least one cell controlled by the apparatus to a total number of random access channel attempts in the at least one cell controlled by the apparatus, wherein the total number of random access channel attempts in the at least one cell controlled by the apparatus is determined as a sum of: the number of failed random access channel attempts in the at least one cell controlled by the apparatus; and the number of successful random access channel attempts in the at least one cell controlled by the apparatus.

According to an example, the apparatus comprises means for performing: counting the number of successful random access channel attempts in the at least one cell controlled by the apparatus.

According to an example, the method comprises: receiving, from the second apparatus, information of random access channel reports related to random access channel attempts in the at least one cell controlled by the apparatus; determining, based on the information of random access channel reports related to random access channel attempts in the at least one cell controlled by the apparatus received from the second apparatus, a value indicating the number of failed random access channel attempts in the at least one cell.

According to an example, wherein the rate of failure for random access channel attempts in at least one cell controlled by the apparatus is determined when the number of failed random access channel attempts in the at least one cell controlled by the apparatus exceeds a threshold value.

According to an example, the information of random access channel reports related to random access channel attempts in the at least one cell controlled by the apparatus is associated to a User Equipment.

According to an example, the information of random access channel reports related to random access channel attempts in the at least one cell controlled by the apparatus is associated to a User Equipment by using UE context information.

According to an example, the method comprises: comparing the information comprising a rate of failure for random access channel attempts in at least one cell controlled by the apparatus with the rate of failure for random access channel attempts in at least one other cell in the network; and determining to change a random access channel configuration of the apparatus based on the comparison.

According to an example, the method comprises determining to change a physical random access channel configuration based on the comparison.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the method is performed by a gNB-DU.

According to an example, the second apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-CU.

According to a further aspect there is provided a computer program comprising instructions for causing an apparatus to perform at least the following: determining information comprising: a rate of failure for random access channel attempts in at least one cell controlled by the apparatus; and/or a number of successful random access channel attempts in the at least one cell controlled by the apparatus and a number of failed random access channel attempts in the at least one cell controlled by the apparatus; and sending the information from the apparatus to a second apparatus.

According to a further aspect there is provided a computer program comprising instructions stored thereon for performing at least the following: determining information comprising: a rate of failure for random access channel attempts in at least one cell controlled by an apparatus; and/or a number of successful random access channel attempts in the at least one cell controlled by the apparatus and a number of failed random access channel attempts in the at least one cell controlled by the apparatus; and sending the information from the apparatus to a second apparatus.

According to a further aspect there is provided a non-transitory computer readable medium comprising program instructions for causing an apparatus to perform at least the following: determining information comprising: a rate of failure for random access channel attempts in at least one cell controlled by the apparatus; and/or a number of successful random access channel attempts in the at least one cell controlled by the apparatus and a number of failed random access channel attempts in the at least one cell controlled by the apparatus; and sending the information from the apparatus to a second apparatus.

According to a further aspect there is provided a non-transitory computer readable medium comprising program instructions stored thereon for performing at least the following: determining information comprising: a rate of failure for random access channel attempts in at least one cell controlled by an apparatus; and/or a number of successful random access channel attempts in the at least one cell controlled by the apparatus and a number of failed random access channel attempts in the at least one cell controlled by the apparatus; and sending the information from the apparatus to a second apparatus.

According to a further aspect there is provided an apparatus comprising means for performing: receiving information comprising: a rate of failure for random access channel attempts in at least one cell controlled by a second apparatus; and/or a number of successful random access channel attempts in the at least one cell controlled by the apparatus and a number of failed random access channel attempts in the at least one cell controlled by the apparatus; and sending the information from the apparatus to a network entity.

According to an example, the network entity comprises at least one of: an Access Node; a decentralized unit of an Access Node; a centralized unit of an Access Node.

According to an example, the information comprising rate of failure for random access channel attempts in at least one other cell in the network is received over an F1 interface.

According to an example, the information further comprises random access channel reports, and wherein the means are further configured to perform: filtering the random access channel reports to contain information regarding random access channel reports for cells controlled by a third apparatus; sending the filtered random access channel reports to the third apparatus.

According to an example, the third apparatus may comprise an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the third apparatus may comprise a gNB-DU.

According to an example, the information of random access channel reports related to random access channel attempts in the at least one cell controlled by the second apparatus is associated to a User Equipment.

According to an example, the information of random access channel reports related to random access channel attempts in the at least one cell controlled by the apparatus is associated to a User Equipment by using UE context information.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-CU.

According to an example, the apparatus comprises an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus comprises a gNB-DU.

According to a further aspect there is provided an apparatus comprising at least one processor; and at least one memory including computer program code; the at least one memory and the computer program code configured to, with the at least one processor, cause the apparatus at least to perform: receiving information comprising: a rate of failure for random access channel attempts in at least one cell controlled by a second apparatus; and/or a number of successful random access channel attempts in the at least one cell controlled by the apparatus and a number of failed random access channel attempts in the at least one cell controlled by the apparatus; and sending the information from the apparatus to a network entity.

According to an example, the network entity comprises at least one of: an Access Node; a decentralized unit of an Access Node; a centralized unit of an Access Node.

According to an example, the information comprising rate of failure for random access channel attempts in at least one other cell in the network is received over an F1 interface.

According to an example, the information further comprises random access channel reports, and wherein the at least one memory and the computer program code are configured to, with the at least one processor, cause the apparatus at least to perform: filtering the random access channel reports to contain information regarding random access channel reports for cells controlled by a third apparatus; sending the filtered random access channel reports to the third apparatus.

According to an example, the third apparatus may comprise an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the third apparatus may comprise a gNB-DU.

According to an example, the information of random access channel reports related to random access channel attempts in the at least one cell controlled by the second apparatus is associated to a User Equipment.

According to an example, the information of random access channel reports related to random access channel attempts in the at least one cell controlled by the apparatus is associated to a User Equipment by using UE context information.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the apparatus comprises a gNB-CU.

According to an example, the apparatus comprises an Access Node.

According to an example, the second apparatus comprises a gNB-DU.

According to an further aspect there is provided an apparatus comprising: circuitry for receiving information comprising: a rate of failure for random access channel attempts in at least one cell controlled by a second apparatus; and/or a number of successful random access channel attempts in the at least one cell controlled by the apparatus and a number of failed random access channel attempts in the at least one cell controlled by the apparatus; and circuitry for sending the information from the apparatus to a network entity.

According to a further aspect there is provided a method comprising: receiving information comprising: a rate of failure for random access channel attempts in at least one cell controlled by an apparatus; and/or a number of successful random access channel attempts in the at least one cell controlled by the apparatus and a number of failed random access channel attempts in the at least one cell controlled by the apparatus; and sending the information to a network entity.

According to an example, the network entity comprises at least one of: an Access Node; a decentralized unit; a centralized unit of an Access Node.

According to an example, the information comprising rate of failure for random access channel attempts in at least one other cell in the network is received over an F1 interface.

According to an example, the information further comprises random access channel reports, and the method comprises: filtering the random access channel reports to contain information regarding random access channel reports for cells controlled by a second apparatus; sending the filtered random access channel reports to the second apparatus.

According to an example, the information of random access channel reports related to random access channel attempts in the at least one cell controlled by the second apparatus is associated to a User Equipment.

According to an example, the information of random access channel reports related to random access channel attempts in the at least one cell controlled by the apparatus is associated to a User Equipment by using UE context information.

According to an example, the rate of failure for random access channel attempts in at least one cell comprises a rate of failure calculated per synchronization signal block per cell.

According to an example, the rate of failure for random access channel attempts in at least one cell comprises a rate of failure calculated per random access channel occasion per cell.

According to an example, the rate of failure for random access channel attempts in at least one cell comprises a rate of failure calculated per random access channel occasion per synchronization signal block per cell.

According to an example, the method is performed by a gNB-CU.

According to an example, the method is performed by an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the apparatus comprises a gNB-DU.

According to an example, the second apparatus may comprise an Access Node.

According to an example, an Access Node may comprise a Base Station, an Evolved Node B (eNB), a gNB, ng-eNB or an NG-RAN node.

According to an example, an NG-RAN node may comprise a gNB or an ng-eNB.

According to an example, the second apparatus may comprise a gNB-DU.

According to a further aspect there is provided a computer program comprising instructions for causing an apparatus to perform at least the following: receiving information comprising: a rate of failure for random access channel attempts in at least one cell controlled by the apparatus; and/or a number of successful random access channel attempts in the at least one cell controlled by the apparatus and a number of failed random access channel attempts in the at least one cell controlled by the apparatus; and sending the information to a network entity.

According to a further aspect there is provided a computer program comprising instructions stored thereon for performing at least the following: receiving information comprising: a rate of failure for random access channel attempts in at least one cell controlled by an apparatus; and/or a number of successful random access channel attempts in the at least one cell controlled by the apparatus and a number of failed random access channel attempts in the at least one cell controlled by the apparatus; and sending the information to a network entity.

According to a further aspect there is provided a non-transitory computer readable medium comprising program instructions for causing an apparatus to perform at least the following: receiving information comprising: a rate of failure for random access channel attempts in at least one cell controlled by the apparatus; and/or a number of successful random access channel attempts in the at least one cell controlled by the apparatus and a number of failed random access channel attempts in the at least one cell controlled by the apparatus; and sending the information to a network entity.

According to a further aspect there is provided a non-transitory computer readable medium comprising program instructions stored thereon for performing at least the following: receiving information comprising: a rate of failure for random access channel attempts in at least one cell controlled by an apparatus; and/or a number of successful random access channel attempts in the at least one cell controlled by the apparatus and a number of failed random access channel attempts in the at least one cell controlled by the apparatus; and sending the information to a network entity.

BRIEF DESCRIPTION OF FIGURES

The invention will now be described in further detail, by way of example only, with reference to the following examples and accompanying drawings, in which.

DETAILED DESCRIPTION

The present disclosure relates to wireless communications. Some examples relate to RACH procedures.

The 5G New Radio (NR) architecture also allows implementation of a split architecture where an Access Node such as a gNB may have a functional internal split into a Centralized Unit (CU), serving a possibly large number of decentralized units (DUs). CU may operate at different protocol layers to the DU. The functional split and architectural choices are specified in "3GPP technical specification 38.401, "Technical Specification Group Radio Access Network; NG-RAN; Architecture description (Release 16)", Version 16.0.0, December 2019.".

Figure 1A:
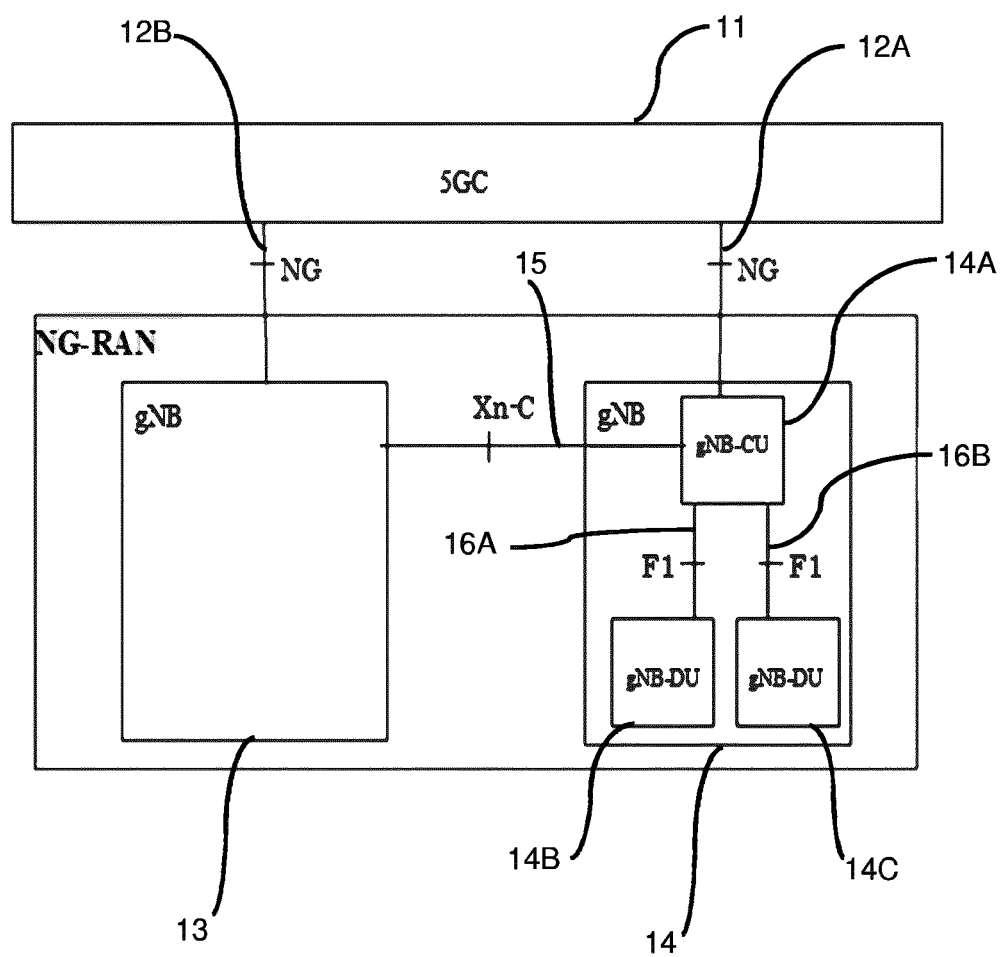
FIG. 1A shows a schematic representation of a network.

A 5G NR architecture is depicted in FIG. 1A. The 5G NR split architecture introduces two new interfaces named E1 (between the control and user plane in CU, e.g. in gNB-CU 14A) and F1 (for example 16A and 16B between CU 14A and DU 14B and 14C). These interfaces are specified, for example, in 3rd Generation Partnership Technical Standard (3GPP TS) 38.460 (E1 Stage 2), 3GPP TS 38.463 (E1 Stage 3), 3GPP TS 38.470 (F1 Stage 2), and 3GPP TS 38.473 (F1 Stage 3). FIG. 1A also depicts Xn-C interface 15 between two gNBs 13 and 14 which provides the means to coordinate them using XnAP procedures as defined in 3GPP TS 38.423, as well as an NG interface 12A and 12B using the NGAP protocol with the 5G Core network (5GC) 11 as defined in TS 38.413.

A RACH can be used by wireless terminals to access a mobile network. RACH accesses have limited control information. RACH accesses among wireless terminals, such as UEs, trying to access the mobile network may lead to collisions. For example, when two or more wireless terminals use the same RACH resource concurrently to access a mobile network they may collide and not be granted access to the mobile network. Furthermore, a RACH procedure may fail when the related RACH parameters are selected in a non-optimized way, such as the Root Sequence Index with which the RACH Preambles are created; this may lead to non-orthogonal preambles being used in neighbouring cells. Additionally, using an unsuitable UE power setting may create Inter-Cell Interference from neighbouring cells leading RACH to fail.

Figure 1B:
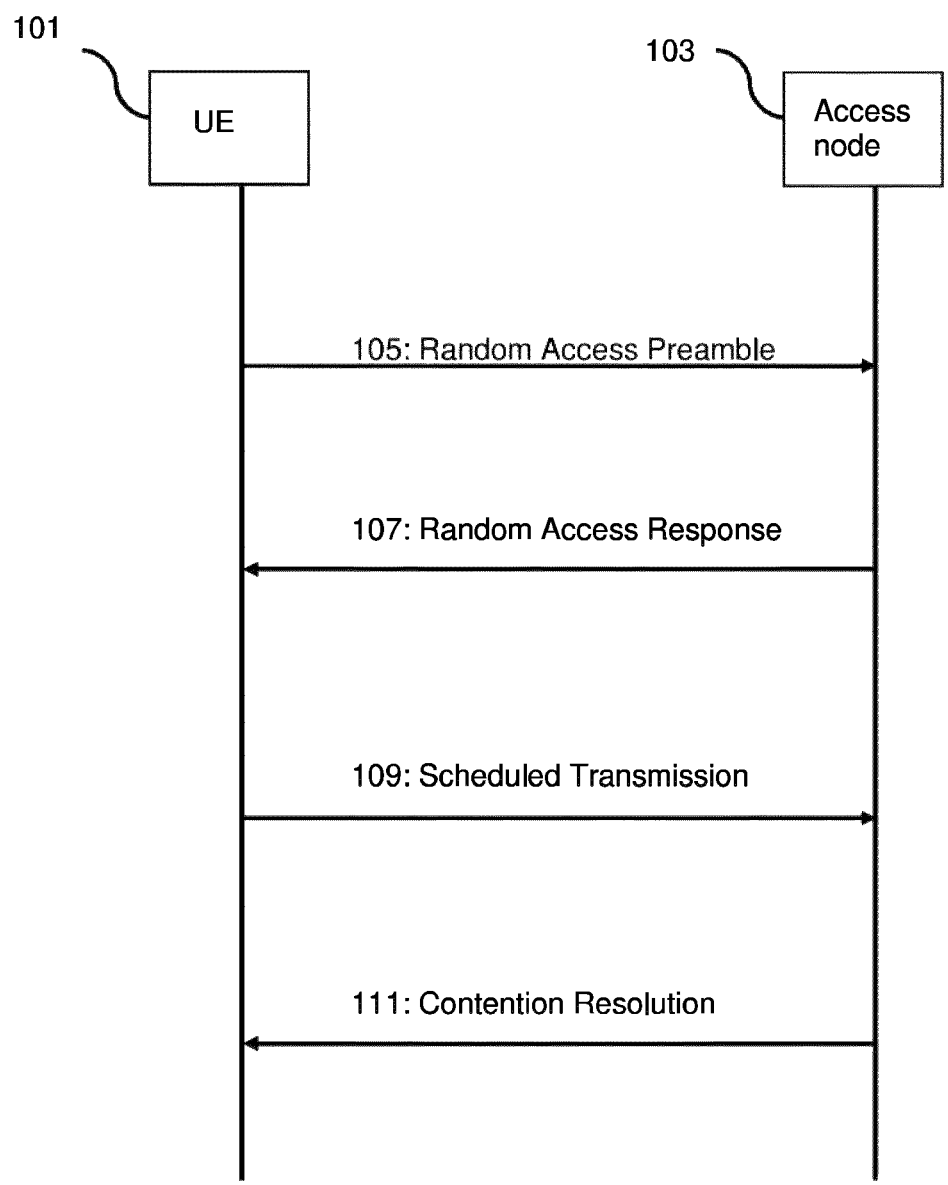
FIG. 1B shows a schematic representation of a network procedure.

There exists Contention Based (CB) and Contention-Free (CF) Random Access. FIG. 1B shows, as an example, a 4-step Contention Based Random Access (CBRA) Procedure.

At step 105 of FIG. 1B, when the CBRA procedure is triggered, UE 101 sends a random access preamble to an Access Node 103. According to some examples, the Access Node 103 may comprise a Base Station, an Evolved Node B (eNB), a gNB, ng-eNB, an NG-RAN node, etc. An NG-RAN node may comprise either a gNB or an ng-eNB. There are different groups of preambles defined to be used at this step, depending on the size of the message to be sent at step 109 and on the channel conditions of UE 101. The UE can obtain information on how to access the channel from a System Information Block 1 (SIB1) broadcast in System Information (SI).

At step 107 of FIG. 1B, the network (in this case exemplified by Access Node 103) responds to UE 101 with a Random Access Response (RAR) upon reception of the preamble. UE 101 then monitors a Physical Downlink Control Channel (PDCCH) channel identified by a Random Access Radio Network Temporary Identifier (RA-RNTI) during a window that starts at the subframe containing the end of the preamble transmission.

Upon receiving the RAR message sent at 107, UE 101 can send an uplink transmission to the network (Access Node 103) at step 109. The size of the transmission depends on the grant received at 107.

Step 111 of FIG. 1B involves the contention resolution phase, where contention between different UEs is resolved.

It should be noted that the scope of the application is not limited to the 4-step RACH example of FIG. 1B, and can also be applied to other RACH procedures.

The random access procedure involves several parameters which are given to a UE, such as UE 101 of FIG. 1B, by the network (e.g. by Access Node 103). Examples of such parameters include: a Physical Random Access Channel (PRACH) configuration index; an initial random access preamble power; a power ramping step in case of PRACH failure; a scaling factor for prioritized random access procedure; a random access preamble index; one or more thresholds for selecting Synchronization System Blocks (SSBs); and Channel State Information Reference Signals (CSI-RS). CSI-RSs can be useful during beam failure recovery procedures, for example. The parameters can be given to the UE through system information (e.g. SIB1). The same parameters are provided for the purpose of Contention-Free Random Access.

Selecting RACH parameters by the network to provide to a UE can be done using a RACH optimization procedure. RACH parameters that can be optimised may include but are not limited to: RACH configuration (resource unit allocation); RACH preamble split (among dedicated, group A, group B); RACH backoff parameter value; RACH transmission power control parameters. RACH optimization may be supported by UE reported information. RACH optimization may be supported by PRACH parameters exchange between Access Nodes. UEs which receive polling signalling may report the number of RACH preambles sent until a successful RACH completion and may also report contention resolution failure. "$3^d$ Generation Partnership Project (3GPP) TS 36.300: Technical Specification Group Radio Access Network; Evolved Universal Terrestrial Radio Access (E-UTRA) and Evolved Universal Terrestrial Radio Access Network (E-UTRAN); Overall description; Stage 2 (Release 15); December 2019" describes support for RACH Optimisation for the case of LTE.

In some examples, a UE RACH Report is created by a UE when a RACH procedure fails. If a network requests a UE RACH Report from a UE, the UE may respond with a message comprising a UE RACH Report. In LTE for example, the UE RACH Report may comprise the number or preambles sent for the last successfully completed random access procedure. An indicator regarding whether contention with another UE that wants to use the same resources of the network is detected or not may also be provided.

For example, in LTE, if the parameter rach-ReportReq is set to true, the content of the rach-Report in the UEInformationResponse message is set to contain the numberOfPreamblesSent which is the number of preambles sent by Medium Access Control (MAC) for the last successfully completed random access procedure together with an indicator regarding whether contention is detected or not. This is indicated, for example, in 3rd Generation Partnership Project (3GPP) TS 36.331; Technical Specification Group Radio Access Network; Evolved Universal Terrestrial Radio Access (E-UTRA); Radio Resource Control (RRC); Protocol specification (Release 15); December 2019; as recited below, where the reference to TS 36.321 is a reference to 3rd Generation Partnership Project (3GPP) TS 36.321; Technical Specification Group Radio Access Network; Evolved Universal Terrestrial Radio Access (E-UTRA); Medium Access Control (MAC) protocol specification (Release 15); December 2019:

5.6.5.3 Reception of the UEInformationRequest Message
1> if rach-ReportReq is set to true, set the contents of the rach-Report in the UEInformationResponse message as follows:
2> set the numberOfPreamblesSent to indicate the number of preambles sent by MAC for the last successfully completed random access procedure;
2> if contention resolution was not successful as specified in TS 36.321 for at least one of the transmitted preambles for the last successfully completed random access procedure:
3> set the contentionDetected to true;
2> else:
3> set the contentionDetected to false In New Radio (NR), the random access procedure may be triggered by a number of events, that in some examples may be different than those in LTE. Examples of such events are described in 3rd Generation Partnership Project (3GPP) TS 38.300; Technical Specification Group Radio Access Network; NR; NR and NG-RAN Overall Description; Stage 2 (Release 15), v.16.0.0, January 2020 as follows: Initial access from RRC IDLE; RRC Connection Re-establishment procedure;

DL or UL data arrival during RRC_CONNECTED when UL synchronisation status is "non-synchronised"; UL data arrival during RRC_CONNECTED when there are no Physical Uplink Control Channel (PUCCH) resources for Scheduling Request (SR) available; SR failure; Request by RRC upon synchronous reconfiguration (e.g. handover); Transition from RRC_INACTIVE; to establish time alignment for a secondary TAG; request for Other SI; Beam failure recovery. It should be noted that other events could trigger the random access procedure.

In some examples, a UE can store more than one RACH procedure related UE RACH Report. In some examples, and according to RAN2 NR agreements (for example 3GPP TSG-RAN3 Meeting #106, Reno, Nev., USA, 18-22 Nov. 2019 R3-196409), a UE can store up to 8 UE RACH Reports. This number may increase in future releases such that more UE RACH Reports can be stored by a UE.

According to RAN2 NR agreements also captured in R3-196409, the "indexes of the SSBs and number of RACH preambles sent on each tried SSB listed in chronological order of attempts' is included in the UE RACH Report.

In LTE, the UE RACH Report can be sent as part of a Radio Link Failure (RLF) report. In such a UE RACH Report, there may be no information identifying the involved cell in the UE RACH Report. However, in NR there are cases where RACH can fail without triggering RLF. In these cases, it can be useful to include information in the UE RACH Report about where (in which cell) RACH failed. In addition, it can be useful to characterize a gNB where RACH failed since it is possible that a RACH procedure is attempted and fails on one gNB and finally succeeds at a different gNB.

In some examples, RACH Configuration Conflict detection and resolution function is located at a gNB-DU. In some cases, it can be useful for a gNB-DU to know the Physical RACH (PRACH) configuration of some or all neighbouring cells to a cell subject to RACH configuration conflict in order to effectively choose a new PRACH Configuration for the cell in conflict.

In some examples, including some examples related to LTE, a UE stores the last RACH procedure. The network collects the UE RACH Report through a UEInformationRequest/Response procedure and the network will retrieve the last procedure recorded by the UE. The trigger of the RACH procedure may or may not involve dedicated RRC signalling.

In some examples, including some examples related to NR, the UE can have a report that stores up to 8 RACH procedures. For the purpose of providing examples only, lists of RACH trigger types categorized based on whether they have an RRC impact or not are given below:

Triggers Involving RRC Dedicated Signalling
Initial access from RRC_IDLE;
RRC Connection Re-establishment procedure;
Request by RRC upon synchronous reconfiguration (e.g. handover);
Transition from RRC_INACTIVE;
Request for Other SI (potentially involving dedicated signalling)

Triggers without RRC Involvement (not Visible to a gNB-CU, for Example)

DL or UL data arrival during RRC_CONNECTED when UL synchronisation status is "non-synchronised";
UL data arrival during RRC_CONNECTED when there are no Physical Uplink Control Channel (PUCCH) resources for Scheduling Request (SR) available;
SR failure;
To establish time alignment for a secondary TAG;
Request for Other SI (using special preambles, handled locally in a gNB-DU)
Beam failure recovery.

As shown, some of the triggers of the RACH procedures stored in the UE RACH Report may involve Radio Resource Control (RRC) dedicated signalling and some may not. Therefore, in a single UE RACH Report RACH procedures with different triggers can co-exist. The gNB-CU becomes aware of RACH procedures that do not involve RRC signalling through the UE RACH Report.

Figure 2A:
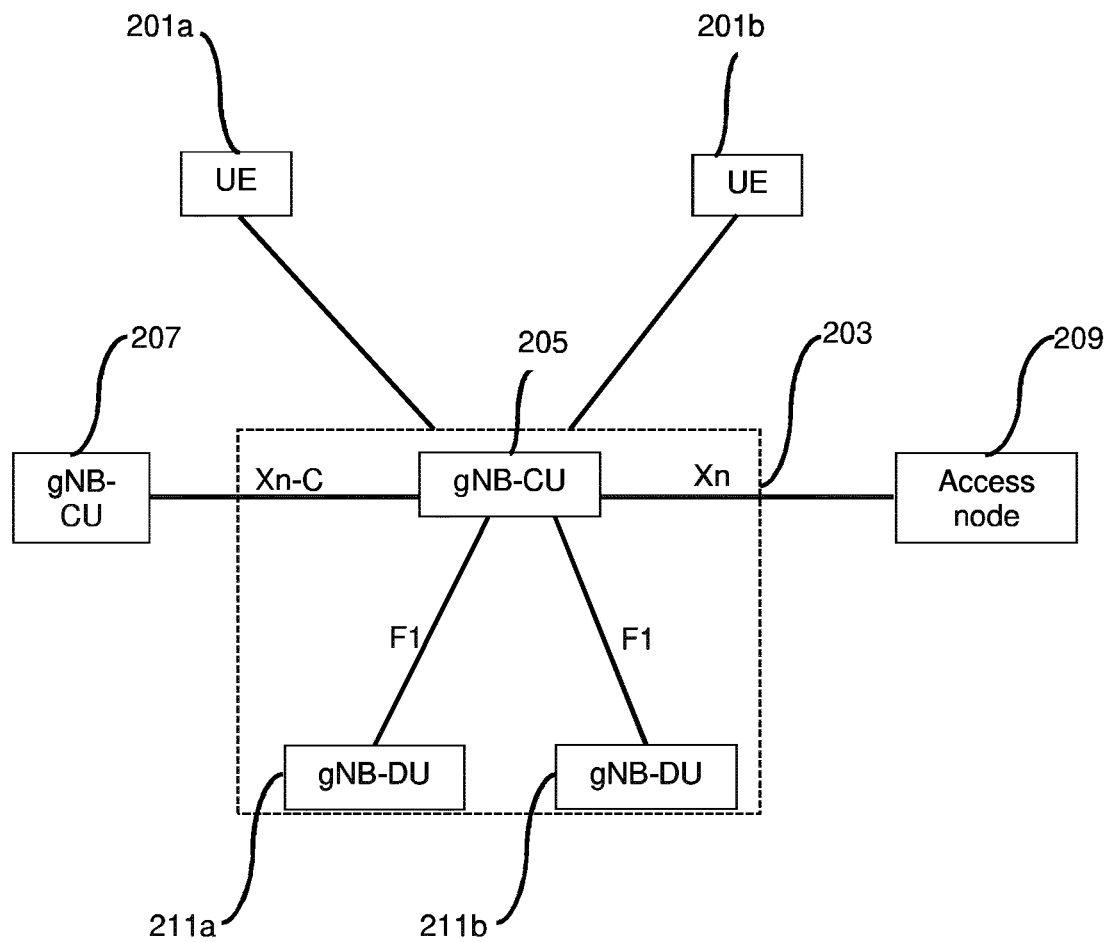
FIG. 2A shows a schematic representation of a network architecture.

FIG. 2A shows an example of a network. In the example, an Access Node 203 comprises a gNB. The gNB comprises a centralized unit (CU), gNB-CU 205 and at least one distributed unit (DU) exemplified as gNB-DU 211a and gNB-DU 211b. The gNB-DU 211a of Access Node 203 can communicate with gNB-CU 205 via an F1 interface, and gNB-DU 211b of Access Node 203 can also communicate with gNB-CU 205 via an F1 interface.

In the example of FIG. 2A, one or more UEs 201a and 201b can communicate with Access Node 203. A UE such as UE 201a or UE 201b may connect to the network via a cell of gNB-DU 211a or gNB-DU 211b. Furthermore, gNB-CU 205 may connect with gNB-CU 207 via an Xn-C interface. In some examples, for example where the Access Node is an NG-RAN node, the gNB-CU 205 may connect with Access Node 209 via an Xn interface.

Examples of the invention use a RACH Failure Rate calculated at a gNB-DU to provide information to a gNB-CU on the RACH performance at the cells of the gNB-DU.

For example, a RACH Failure Rate calculated at gNB-DU 211a can provide information to gNB-CU 205 on the RACH performance at the cells of gNB-DU 211a in terms of average failed RACH accesses. NG-RAN node 203 can, in some examples, forward the RACH Failure Rate through the Xn or Xn-C interface to other neighbouring NG-RAN nodes. These neighbouring NG-RAN nodes may not have an active UE context on the particular UEs of their neighbours. In these cases, the RACH information can be used in a statistical sense. The RACH Failure Rate can therefore be useful to neighbouring NG-RAN nodes. By forwarding the RACH Failure Rate, unnecessary signalling of full UE RACH Report information is avoided.

In some examples, gNB-DU 211a can provide information to gNB-CU 205 on the RACH performance at the cells of gNB-DU 211a by separately sending success information on RACH accesses that are locally available at gNB-DU 211a and failure information on RACH accesses that gNB-DU 211a has received through UE RACH Reports.

In some examples, success information of RACH accesses may also be available in the UE RACH Reports provided to gNB-DU 211a. The success information may be provided as the last RACH attempt in a RACH procedure comprising multiple unsuccessful attempts and which led to the success of the RACH procedure. NG-RAN node 203 can, in some examples, forward the success information and the failure information on RACH procedures through the Xn or Xn-C interface to other neighbouring NG-RAN nodes.

In examples, gNB-CU 205 forwards through the F1 interface to gNB-DUs 211a and 211b the RACH Failure Rate regarding cells of its neighbouring gNB-CUs or regarding cells of other gNB-DUs under the gNB-CU (for example, gNB-CU 205 may forward the RACH Failure Rate for cells of gNB-DU 211a to gNB-DU 211b).

In some other examples, gNB-CU 205 forwards through the F1 interface to gNB-DUs 211a and 211b information on successful and failed RACH attempts separately, instead (or in some cases, as well as) of a calculated failure rate, regarding cells of its neighbouring gNB-CUs or regarding cells of other gNB-DUs under the gNB-CU (for example, gNB-CU 205 may forward information on RACH success and RACH failure of RACH accesses for cells of gNB-DU 211a to gNB-DU 211b). In some examples, a gNB-CU receives UE RACH Reports from UEs connected to the gNB-CU. For example, gNB-CU 205 may receive UE RACH Reports from UE201a and/or UE 201b. UE RACH Reports can contain: old RACH information for which no active UE context exists; new RACH information for which an active UE context exists; or a combination of old RACH information and new RACH information. The gNB-CU can forward to each of the gNB-DUs under the gNB-CU, UE RACH Reports it receives from the UEs. For example, gNB-CU 205 may forward, to gNB-DU 211a or gNB-DU 211b, UE RACH Reports from UE 201a and UE 201b.

In some examples, such an in examples related to NR for example, a UE can store up to 8 UE RACH Reports of RACH procedures attempted by the UE. A UE RACH Report may therefore comprise 8 individual UE RACH Reports involving RACH procedures that may have taken place at the gNB that a UE connects or is connected to or at some other gNBs or a mixture of those cases. The gNB where the UE is connected will not have active UE contexts of RACH procedures/reports that have happened at other gNBs. The RACH procedures/reports that have happened at other gNBs can be defined as "old RACH information". Since the UE RACH Report contains the cell id where the RACH attempt happened the gNB can for example know that a RACH attempt did not happen at its cells and is a part of old RACH information.

In some examples, a gNB keeps a list of all UE contexts for active UEs. So, a RACH procedure taking place for an active UE can be defined as "new RACH information". This will be at the cells of the gNB (i.e. the gNB can match its cell information with the cell id of the UE RACH Report).

In some examples, if a UE RACH Report comprises RACH information on cells of a gNB-DU under the gNB-CU, the UE RACH Report is forwarded to the gNB-DU by the gNB-CU (via an F1 interface). For example, if a UE RACH Report comprises information on cells of gNB-DU 211a under gNB-CU 205, the UE RACH Report is forwarded to gNB-DU 211a.

In some examples, if a UE RACH Report contains mixed RACH information both on cells of a gNB-DU and on other cells of other gNB-DUs (of the same or neighbouring gNB-CU), the UE RACH Report may be filtered at the gNB-CU and the filtered UE RACH Report with the relevant information on RACH accesses on cells of the gNB-DU is forwarded through the F1 interface. Filtering of the RACH content can reduce unnecessary information received at a gNB-DU. For example, if a UE RACH Report comprises information on cells of gNB-DU 211a under gNB-CU 205 and on gNB-DU 211b, the UE RACH Report can be filtered to remove some of the information, namely information involving cells of gNB-DU 211b before the filtered UE RACH Report is forwarded from the gNB-CU to gNB-DU 211a.

A UE RACH Report may contain information on RACH accesses both at a given gNB-DU and at other gNB-DUs as mentioned above. In some examples, a gNB-DU does not need to know (raw) information on RACH procedures at other gNB-DUs as contained in the UE RACH Report. When the gNB-CU sends the UE RACH Report to a gNB-DU, the gNB-CU can remove (filter out) RACH information that is relevant to cells of other gNB-DUs. When a gNB-CU forwards, to a first gNB-DU, a UE RACH Report that has been received from a UE involving cells of a second gNB-DU, the information of the UE RACH Report can be filtered based on at least one cell id indication in the UE RACH Report and based on information at the gNB-CU regarding which cells the first gNB-DU is controlling. Therefore, the gNB-CU can remove, from the UE RACH Report, information relating to cells which are not controlled by the first gNB-DU. In this way, when the gNB-CU filters the UE RACH Report before forwarding, the first gNB-DU does not receive information in the forwarded UE RACH Report that it not relevant to the first gNB-DU. The information filtered out at the gNB-CU may be considered to be unnecessary for the first gNB-DU.

UE RACH Reports can be considered to provide "raw" RACH information. From the RACH information of a UE RACH Report together with the total number of successful RACH attempts, a RACH Failure Rate can be calculated. The RACH Failure Rate could be calculated by a gNB-DU or by another node that is provided with the total number of successful RACH attempts. RACH Outcome information comprises the RACH Failure Rate. RACH Outcome information can be considered to be a different information to a UE RACH Report. RACH Outcome information may comprise an IE indicating a RACH Failure Rate.

Even though in some examples only the necessary RACH Report Information is forwarded to a gNB-DU, RACH Failure Rate of attempts at other cells, for example at neighbouring cells controlled by other gNB-DUs, can still be included after the filtering to the gNB-DU since the RACH Failure Rate gives statistical information on RACH performance in other cells. As such, in some examples, the overall RACH information for a given gNB-DU may comprise the RACH Failure Rate of attempts at other cells of other gNB-DUs (under the same or different gNB-CU) as well as raw UE RACH Report information of cells of the given gNB-DU, but not raw UE RACH Report information of cells of the other gNB-DUs.

In some examples, if a UE RACH Report contains RACH information on cells not involving a neighbouring NG-RAN node (or gNB-CU in case of CU-DU split), the corresponding information is filtered out and the filtered UE RACH Report is sent to the neighbouring NG-RAN node (or gNB-CU in case of CU-DU split) over, for example, an Xn interface. In some examples, an NG-RAN node may decide not to filter the UE RACH Report and send the whole UE RACH Report over the Xn interface to a neighbouring NG-RAN node in which case the processing of the UE RACH Report is left to the recipient NG-RAN node.

In some examples, UE RACH Reports comprise indexes of the SSBs and number of RACH preambles sent per RACH occasion on each tried SSB listed in chronological order of attempts.

Figure 2B:
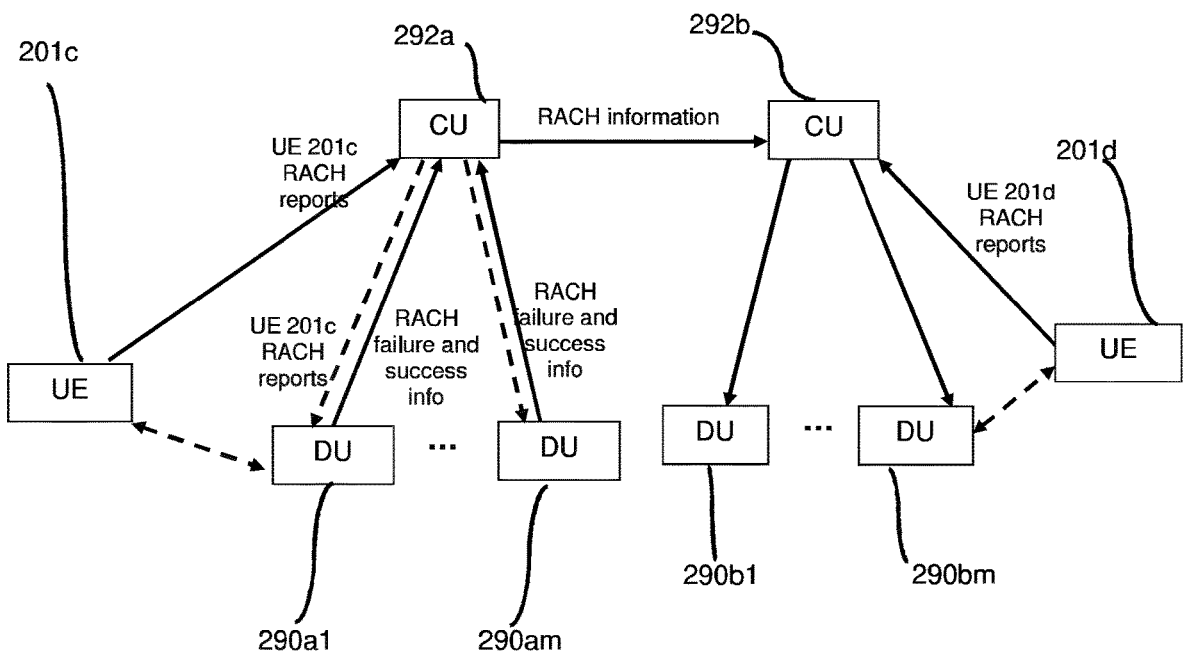
FIG. 2B shows a schematic representation of a network architecture.

An example of a network architecture is shown in FIG. 2B. The DUs and CUs of FIG. 2B may be, for example, gNB-DUs and gNB-CUs respectively.

The example of FIG. 2B can be used to illustrate RACH information flow from CU 292a to CU 292b. Although not discussed below, RACH information could flow from CU 292b to CU 292a in the same manner. RACH information may comprise, for example, information on RACH successes and RACH failures for one or more UEs (e.g. UE 201c) at one or more cells of DU 290a1 to DU 290am (where m is an integer value greater than 1).

In some examples, UE 201c may be connected to DU 290a1. UE 201c sends UE RACH reports to CU 292a. In some examples the UE RACH reports may be sent using an RRC transmission. The UE RACH reports may comprise information regarding the number of failed RACH attempts for one or more cells of DU 290a1 that CU 292a is controlling. In some examples, the comprised information regarding the number of failed RACH attempts for one or more cells of DU 290a1 may be forwarded from CU 292a to DU 290a1. In some examples, the UE RACH reports sent to CU 292a can be send to DU 290a1. From this information, DU 290a1 can determine the number of failed RACH attempts. DU 290a1 can then send the information comprising the number of failed RACH attempts, as well as the number of successful RACH attempts, to CU 292a. DU 290a1 can correlate the number of failed RACH attempts and number of successful RACH attempts that are sent to CU 292a to ensure that the numbers are both for the same observation period (i.e. are measured over the same period of time).

In some examples, DU 290a1 may send information on RACH successful attempts to CU 292a. The success information may be sent over an F1 interface. The success information may be for the one or more cells of DU 290a1. The success information may be internally stored at DU 290a1.

In some examples, CU 292a may send RACH information regarding RACH successful attempts and RACH failed attempts to CU 292b.

In some examples, UE 201d may send RACH report information to CU 292b. The UE RACH report information may comprise information regarding RACH failures for UE 201d at DU 290bm (m is an integer value greater than 1), for example.

In some examples, CU 292b can send, to DU 290b1 and/or DU 290bm, RACH success information from DU 290a1 under CU 292a, RACH failure information from DU 290a1 under CU 292a and UE RACH reports from UE201d received at CU 292b.

By using the messages as described above in relation to FIG. 2B, UEs (e.g. UE 201c) can send RACH report to CUs (e.g. CU 292a) with RACH failure information over the cells of one or more DUs (e.g. DU 290am) that a CU (e.g. CU 292a) is controlling.

By using the messages as described above in relation to FIG. 2B, a CU (e.g. CU 292a) can receive RACH failure and success information from DU 290am. A CU (e.g. CU 292a) can forward these RACH success information and RACH failure information separately through Xn to other CUs (e.g. CU 292b).

As both the RACH failure information and RACH success information are sent from the same DU, the DU can ensure that the number of failed RACH attempts and the number of successful RACH attempts are recorded in the same period of time (in the same observation period). In some examples the DU can also include information regarding successful and failed RACH attempts that may not be signalled to a CU controlling the DU by an RRC message. For example, the DU can include information regarding RACH procedures that happen locally at the DU, which may for example be, for Beam Failure Recovery. The DU can then combine this information with information received in UE RACH reports from its controlling CU.

As described above, a CU can send, to DUs under the CU, RACH success information and RACH failure information over cells of neighbouring CUs. For example, RACH success information and RACH failure information of cells of DU 290a1 can be forwarded to one or more DUs of CU 292b (e.g. DU 290b1, . . . , DU 290bm).

The RACH success information and RACH failure information can be used at a DU to determine RACH failure rates in cells of neighbouring CUs. According to some examples, a gNB-DU may send, to a gNB-CU, a RACH Failure Rate at the cells of the gNB-DU. The RACH Outcome Information may comprise the RACH Failure Rate, and may be sent over an F1 interface.

According to some examples, gNB-DU may send, to a gNB-CU, information on RACH successes and, separately, information on RACH failures at the cells of the gNB-DU. The RACH Outcome information in these examples may comprise RACH success and RACH Failure information on RACH attempts, and may in some examples be sent over an F1 interface.

According to some examples a first Access Node may send, to a second Access Node, UE RACH Reports and RACH Outcome Information at the cells of the sending first Access Node.

According to some examples, the first Access Node may send, to the second Access Node, a filtered UE RACH Report comprising RACH information on cells of the second Access Node. This may be sent over an Xn interface. Alternatively, the UE RACH Report may be sent unfiltered containing RACH information on all the cells of a network (e.g., also the cells of the first Access Node). In some examples, the first Access Node may comprise an NG-RAN node. The second Access Node may comprise an NG-RAN node. In some examples using a split network architecture, the first Access Node may comprise a gNB-CU and the second Access Node may comprise a gNB-CU.

According to some examples, a gNB-CU may send, to a gNB-DU, a RACH Failure Rate on the cells of the other gNB-DUs managed by the gNB-CU.

According to some examples, a gNB-CU may send, to a gNB-DU, the filtered UE RACH Report of RACH accesses at the cells of gNB-DU.

According to some examples, a gNB-CU may send, to a gNB-DU, an unfiltered UE RACH Report comprising all RACH information (on different gNB-DUs of the gNB-CU or of a potentially neighbouring gNB-CU) that a UE has logged.

Figure 3:
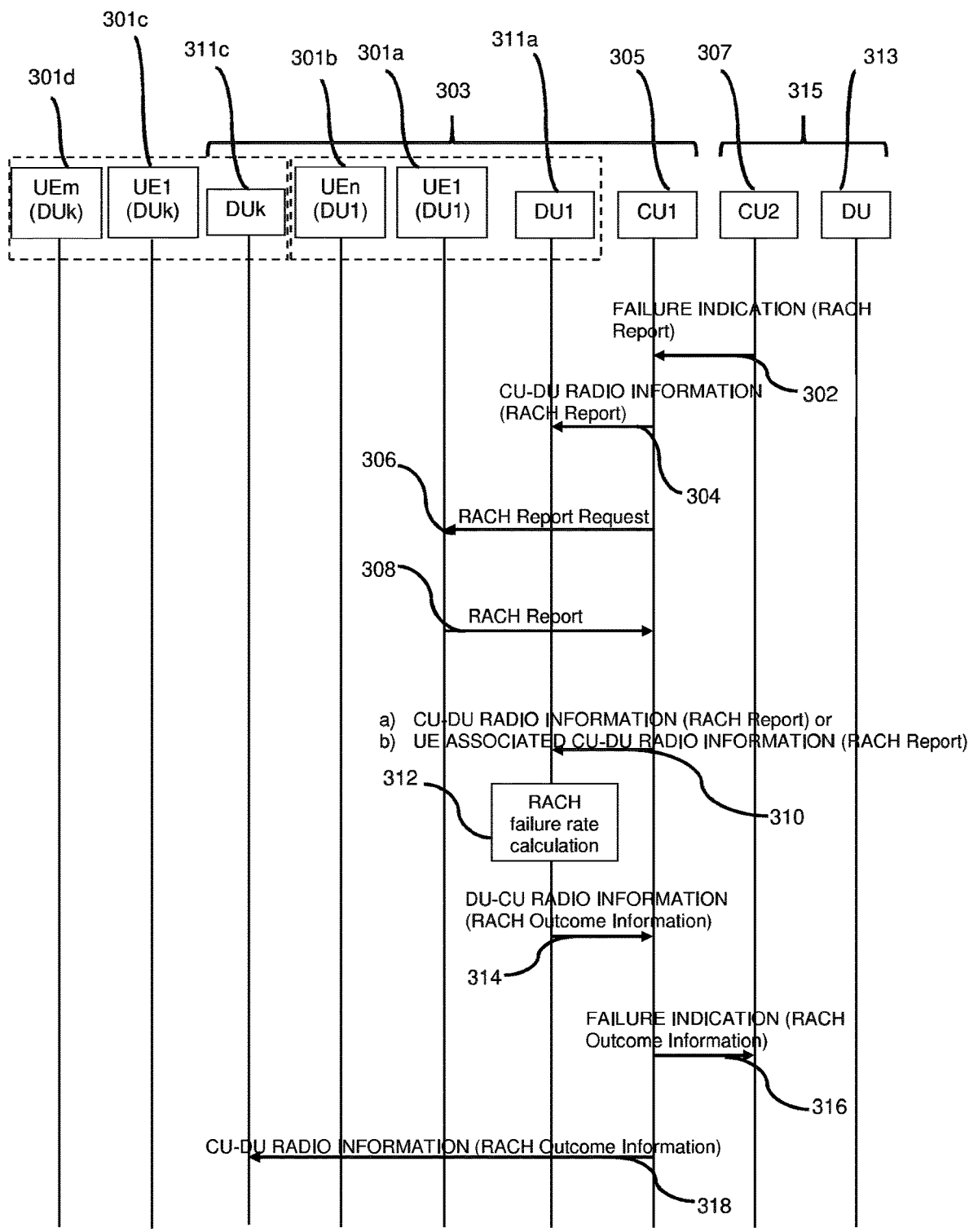
FIG. 3 shows schematic representation of a message flow.

An example message flow between entities in a network is shown in FIG. 3. In the network of FIG. 3, an Access Node 303, which may for example comprise a gNB, comprises CU1 305. CU1 305 may be connected to one or more DUs such as DU1 311a and DUk 311c. DU1 311a may be connected to one or more UEs such as UE1(DU1) 301a and UEn(DU1) 301b, for example. DUk 311c may be connected to one or more UEs such as UE1(DUk) 301c and UEm (DUk) 301d, for example.

Access Node 315 of FIG. 3, which may for example comprise a gNB, comprises CU2 307 and DU 313.

According to some examples, a DU controls at least one cell of a network. When the DU is a part of a gNB, the DU may be a gNB-DU. When a CU is a part of a gNB, the CU may be a gNB-CU.

At step 302, Access Node 315 sends a failure indication message to Access Node 303. The failure indication message sent at 302 may comprise a XnAP FAILURE INDICATION message. The message sent at 302 may comprise UE RACH Reports from RACH attempts at the cells of Access Node 315. In some examples, the FAILURE INDICATION message may comprise UE RACH Reports on failed RACH attempts on cells of Access Node 303 if a UE attempted RACH on Access Node 303 and failed, but the UE succeeded at Access Node 315.

In some examples, Access Node 303 comprises an NG-RAN node. In some examples, Access Node 315 comprises an NG-RAN node. For example, Access Node 315 may send a FAILURE INDICATION message comprising a UE RACH Report in a cell of DU 313.

In an example, the failure indication message is sent from CU2 307 to CU1 305. The failure indication message may comprise one or more UE RACH Reports. The FAILURE INDICATION message may comprise an Information Element (IE). In some examples, the FAILURE INDICATION message can be exchanged over an Xn interface.

In an example, the NR Cell Global Identity (CGI) or some other cell identifier e.g., the Physical Cell Identity (PCI), could be used to identify the cell where RACH failed as well as the gNB owning the cell (Access Node 303) in this case. In some examples, filtering of the UE RACH Report(s) may be used to isolate only RACH information that pertains to the cells of the recipient (in this case, cells of Access Node 303) of the FAILURE INDICATION message. This filtering may be performed at the side of the sending Access Node 315. In examples where the inter-NG-RAN node communication is performed via the 5GC, a similar entry in corresponding NG signaling procedure can be used.

In some examples, for the Uplink (UL) direction, Normal Uplink (NUL) and Supplementary Uplink (SUL) carriers may be reported separately.

The failure rate information per RACH occasion granularity can be further calculated by the gNB-DU. This can be enabled by further including in the UE RACH Reports information on a per RACH occasion granularity. Each entry of the UE RACH Report in this case comprises indexes of the SSBs and number of UE RACH preambles sent per RACH occasion on each tried SSB listed in chronological order of attempts. This can further help a gNB-DU under gNB-CU1 305 (e.g. gNB-DU1 311a) to identify colliding RACH occasions in PRACH configurations.

The failure indication message sent at 302 may correspond to a XnAP FAILURE INDICATION message. The failure indication message sent at 302 may comprise an additional IE to indicate UE RACH Reports that have been received from Access Node 315 and involve cells of Access Node 303.

At step 304, CU1 305 sends CU-DU RADIO INFORMATION message to DU1 311a. The CU-DU Radio information may comprise UE RACH Report information received at step 302 by CU1 305, or any other UE RACH Report information that is accessible to CU1 305.

The CU-DU RADIO INFORMATION message sent at 304 may include at least one UE RACH Report indicating information on failed RACH attempts at cells of Access Node 303, and more specifically on failed RACH attempts at cells of DU1 311a.

The message sent at step 304 may be sent via a newly defined F1 Application Protocol (FLAP) message or the CU-DU RADIO INFORMATION message may be reused.

The CU-DU RADIO INFORMATION sent at 304 may be per cell ID, such that the CU-DU RADIO INFORMATION message is associated with a cell identifier (ID).

At step 306, CU1 305 sends a UE RACH Report request to UE1(DU1) 301a. UE1(DU1) 301a responds at 308 by sending a UE RACH Report to CU1 305. Step 306 can be performed with the UEInformationRequest and UEInformationResponse procedures as described in LTE, for example.

At step 310, CU1 305 sends CU-DU RADIO INFORMATION message to DU1 311a. The CU-DU Radio information may comprise filtered UE RACH Reports of RACH accesses at the cells of DU 311a. Alternatively, the CU-DU RADIO INFORMATION message sent at 310 may comprise an unfiltered UE RACH Report comprising all RACH information (on different gNB-DUs of CU1 305 other than DU1 311a or of a potentially neighbouring gNB-CU such as CU2 307) that a UE has logged. The UE RACH Report information sent at 310 may have previously been received at CU' from UEs (such as at step 308) or from a neighbouring gNB-CU through the Xn interface (such as at 302).

The CU-DU Radio Information sent at 310 may be sent in a F1 AP message.

According to an embodiment, the message sent at 310 may be Non-UE associated, such that the CU-DU RADIO INFORMATION message of step 310 does not provide any UE context.

According to another embodiment, the message sent at 310 may be UE associated when possible. As such, when a UE context for a UE RACH Report from an active UE is available. In some examples, the message sent at step 304 may be non-UE associated, and the message sent at step 310 may be UE associated. The non-UE associated information can be used at a point in time when UE RACH Reports may be available but the UE connection has been released.

If a UE context is available in the gNB-DU for the UE RACH Reports transferred in step 310, in some examples DU1 311a can consider the UE context to perform RACH optimization per UE.

At step 312, DU1 311a calculates a RACH Failure Rate. To calculate the RACH Failure Rate, DU1 311a can use both internal information on the number of successful RACH procedures (per SSB Index) as well as the number of failed RACH attempts from information obtained through UE RACH Reports, which DU1 311a may have received at step 304 or 310, for example. DU1 311a can use knowledge of the number of successful RACH procedures (per SSB Index). To give an example, we call the number of successful RACH procedures (per SSB Index) for cells of DU1 311a as numSuccRACHSSB.

To calculate the RACH Failure Rate, according to one example, DU1 311a can use the UE RACH Report information received at step 310 and/or at step 304 as well as the numSuccRACHSSB. CU1 305 having received both a) UE RACH Reports from its UEs (e.g. UE 301a) as well as b)

forwarded (possibly filtered) UE RACH Reports from its neighbours (e.g. CU2 307) related to RACH attempts on cells of CU1 305, knows the number of failed RACH procedures (both at MAC level, e.g., initial access, BFR) and at RRC level (e.g., due to handover) as they are indicated in the UE RACH Reports per SSB Index. At step 310 and/or at step 304, this information is forwarded by CU1 305 to DU1 311a by forwarding UE RACH Reports or filtered UE RACH Reports to DU1 311a. A UE RACH Report indicates 'indexes of SSBs and number of RACH preambles sent on each tried SSB listed in chronological order of attempts' for which a UE RACH Report was created by a UE (for which RACH failed). As an example, the total number of failed attempts can be called numFailRACHSSB.

To calculate the RACH Failure Rate, according to another example, DUk 311c can use the RACH outcome information received at step 314 by CU1 305 which is then, in some examples, forwarded to DUk 311c. In some examples, DUk 311c may additionally or alternatively use the RACH outcome information received in step 316 by CU2 307 in an inter-gNB scenario and forwarded to DUk 311c. The RACH outcome information may comprise separately signalled information on successful and failed RACH attempts on the cells of its neighbours under the same or other gNB-CU. The calculated RACH Failure Rate in this case corresponds to the ratio of failed RACH attempts over the sum of the overall failed and successful RACH attempts in a cell, signalled in the RACH outcome information.

DU1 311a therefore is aware of the number of failed RACH procedures at the cells of DU1 311a.

According to one example, RACH Failure Rate per SSB Index at cells of DU1 311a can then be calculated at DU1 311a as the ratio numFailRACHSSB/(numSuccRACHSSB+numFailRACHSSB).

According to another example, RACH Failure Rate per SSB Index at cells of DU1 311a can then be calculated at a different gNB-DU, e.g. DUk 311c, as the ratio numFailRACHSSB /(numSuccRACHSSB+numFailRACHSSB), where numFailRACHSSB (e.g., RACH failure information) and numSuccRACHSSB (e.g., RACH success information) are signalled as part of the RACH Outcome information in step 318 or forwarded from CU2 307.

The RACH Failure Rate may be indicated as a value between 0 and 100 to indicate a percentage (for instance a number x is understood in the sense of x %). A RACH Outcome entry can indicate for each cell of an NG-RAN node (gNB/ng-eNB), the RACH Failure Rate per SSB index reported both for the NUL and SUL carriers. The failure rate information per RACH Occasion granularity may further aid DU1 311a to identify colliding PRACH configurations within the RACH Occasion.

In some examples, counters can be used at DU1 311a in order to count a number of successful/failed RACH attempts.

In some examples, a counter at DU1 311a is used to count the number of successful RACH attempts. This measurement counts the number of successful RACH procedures at the DU1 311a. In some examples, the measurement can be split into sub-counters per SSB index. In some example, the measurement can be split into subcounters per RACH Occasion per SSB Index. A RACH occasion can be seen as a resource in which a RACH access can be performed. RACH occasions are allocated in time, such that there is an opportunity to send a RACH preamble every so often. The number of successful RACH attempts is an integer value.

In some examples, a counter at DU1 311a is used to count the number of failed RACH attempts. This measurement can be split into subcounters collecting/counting failed RACH procedures for L1/L2 RACH attempts and by failed RACH procedures for L3 RACH attempts (information received over the F1 interface through the CU-DU RADIO INFORMATION message, e.g. at steps 304 and 310). Both counters can be further subdivided to collect failed RACH attempts of L1/L2 RACH procedures or L3 RACH attempts per SSB index (or per RACH Occasion per SSB Index).

In some examples, a number of failed RACH attempts may also contain a cause value to indicate the RACH trigger that triggered the failed RACH procedure. The cause value may be an integer value (e.g., cause=1 could indicate Initial Access, cause=10 could indicate beam failure recovery, etc.). A counter at the DU1 311a can be used to calculate the number of failed RACH attempts per RACH trigger type or per group of trigger types. For instance, this counter may count the failed RACH procedures for L1/L2 RACH attempts or corresponding to L3 RACH attempts.

Step 312 can be optional, or the counter used for RACH Failure Rate calculation in step 312 can serve node internal purpose or be used for e.g. reporting to the Operations, Administration, and Maintenance (OAM) system. In all these cases, the RACH Outcome Information in step 314 may comprise separate RACH success information and RACH Failure information on RACH attempts.

At step 314, the RACH Outcome information at cells of DU1 311a calculated at 312 can be sent to CU1 305 from DU1 311a. The message sent at step 314 may be sent via a newly defined F1AP message or may be a part of a DU-CU RADIO INFORMATION message.

At step 314, the RACH Outcome information comprising RACH Failure Rate calculated at 312 or comprising separate RACH success information and RACH failure information on RACH attempts can be sent to CU1 305 from DU1 311a. DU1 311a can indicate to CU1 305 the RACH Failure Rate of DU1 311a through a newly defined F1AP message or through the DU-CU RADIO INFORMATION message. DU1 311a can also indicate to CU1 305 separate information on successful and information on failed RACH attempts of DU1 311a through a newly defined F1AP message or through the DU-CU RADIO INFORMATION message. Furthermore, the message sent at step 314 may be sent via the Xn interface to neighbouring CUs, such as CU2 307 as shown in step 316. As shown at step 318, CU1 305 managing DU1 311a can further forward RACH Outcome information to other DUs managed by CU1 305 such as DUk 311c.

RACH Outcome information sent at 314, 316 and 318 may be per cell ID and indicate the average number of failed RACH attempts per SSB index. The average number may be indicated as a value between 0 and 100. The value may represent a percentage value. Alternatively, if DU1 does not calculate this average and step 312 is bypassed, the RACH Outcome information sent at 314, 316 and 318 may comprise separate information on successful RACH attempts and information on failed RACH attempts per SSB index. The RACH Outcome information can indicate for each cell of an Access Node (gNB/ng-eNB), the RACH Failure Rate or the successful and failed RACH attempts per SSB index reported both for the NUL and SUL carriers.

In some examples, the RACH Outcome message sent at 314, 316 and 318 may comprise aggregated RACH Outcome information which has been received at CU1 305 from different gNB-DUs under the gNB-CU or gNB-DUs in other Access Nodes. In some examples, the RACH Outcome information may not be aggregated.

DU1 311a may also receive RACH Outcome information regarding DUs under other Access Nodes or other DUs under CU1 305. DU1 311a can compare the failure rate at DU1 311a with this information.

It will be understood that the described steps of the method are not necessarily purely sequential, according to some examples. For example, in terms of timings there may be overlap between steps 302, 304, 306. In some examples, there may be overlap between step 316 and 318.

Figure 4:
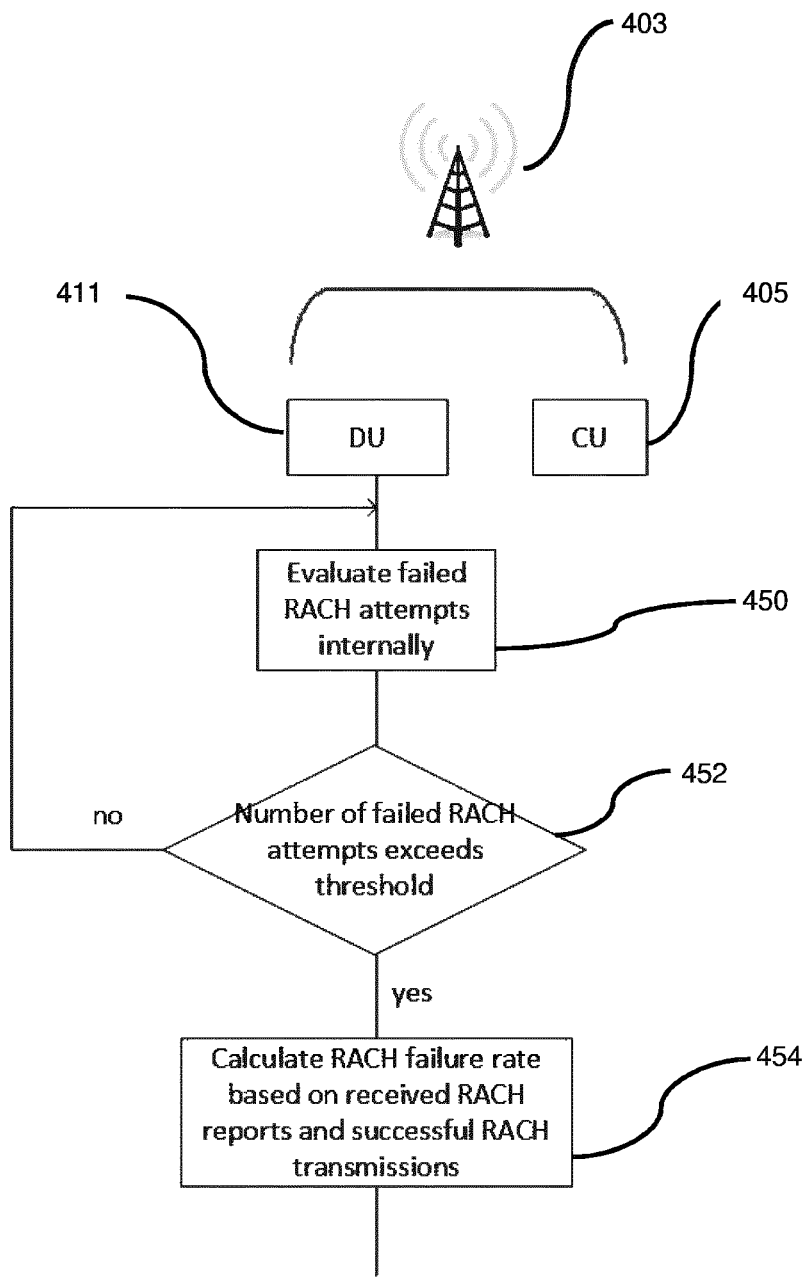
FIG. 4 shows a schematic representation of a method.

FIG. 4 shows an example of a method carried out at an Access Node 403. Access Node 403 may, in some examples, comprise a gNB. Access Node 403 may be split into a CU 405 and DU 411.

At step 450, DU 411 evaluates failed RACH attempts. At step 450, DU 411 may count the number of failed RACH attempts by using a counter, for example.

At step 452, DU 411 determines whether a number of failed RACH attempts measured at step 450 exceeds a threshold value. The threshold value may, in some examples, be a predetermined value stored at DU 411. The threshold value may be dependent on the trigger that triggered the RACH attempt. If the number of failed RACH attempts does not exceed a threshold value, the process reverts back to step 450. If the number of failed RACH attempts measured at step 450 exceeds the threshold value, DU 411 is triggered to calculate the RACH Failure Rate based on received UE RACH Reports and successful RACH transmissions at step 454. As an alternative or in addition to sending the RACH failure rate, if the number of failed RACH attempts measured at step 450 exceeds the threshold value, DU 411 is triggered to send RACH Outcome Information, comprising information on successful and information on failed RACH attempts, to its CU. Following step 454, the method may, in some examples, proceed to further steps, such as providing the calculated RACH Failure Rate to CU 405.

When a gNB-DU has knowledge of RACH Failure Rates in its cells, as well as knowledge of RACH Failure Rates of cells of other nodes, obtained either by reception of calculated RACH Failure Rate information or by reception of the number of failed and successful RACH attempts, the gNB-DU can reconfigure its PRACH configuration based on a comparison of these rates. For example, if the RACH Failure Rate in the cells of a gNB-DU is lower than a RACH Failure Rate of cells of other nodes, the gNB-DU can reduce power usage. Alternatively, if the RACH Failure Rate in the cells of a gNB-DU is higher than a RACH Failure Rate of cells of other nodes, the gNB-DU can increase power usage. By using RACH Failure Rates instead of full UE RACH Report information for cells from other nodes, the amount of information required to be signalled is reduced. This may be particularly useful in NR networks for example, where UE RACH Report information is larger in size than in LTE networks and where there are a higher number of possible triggers than in LTE networks.

Figure 5:
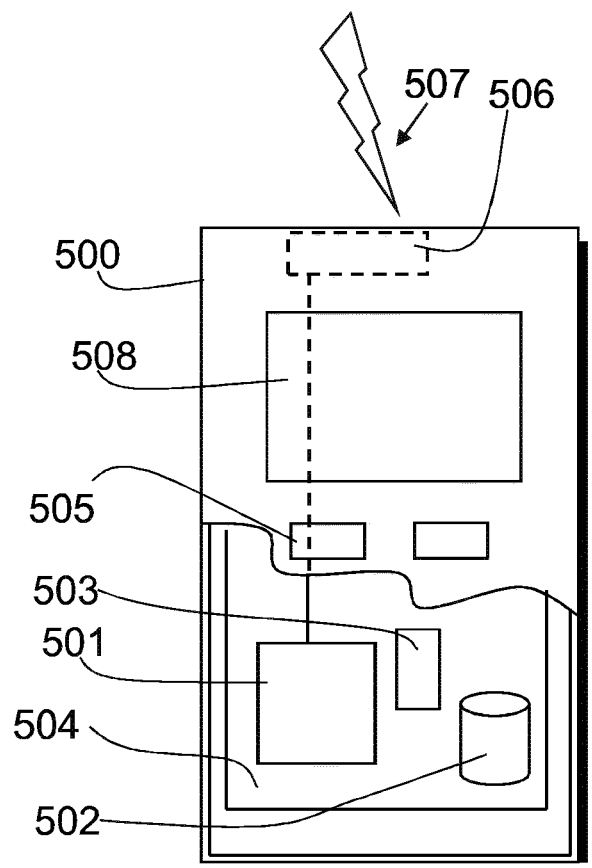
FIG. 5 shows schematic representation of an apparatus according to an example.

A possible wireless communication device will now be described in more detail with reference to FIG. 5 showing a schematic, partially sectioned view of a communication device 500. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 500 may receive signals over an air or radio interface 507 via appropriate apparatus for receiving and may transmit signals via appropriate apparatus for transmitting radio signals. In FIG. 5, transceiver apparatus is designated schematically by block 506. The transceiver apparatus 506 may be provided for example by means of a radio part and associated antenna arrangement. The antenna arrangement may be arranged internally or externally to the wireless device.

A wireless device is typically provided with at least one data processing entity 501, at least one memory 502 and other possible components 503 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 504. The user may control the operation of the wireless device by means of a suitable user interface such as key pad 505, voice commands, touch sensitive screen or pad, combinations thereof or the like. A display 508, a speaker and a microphone can be also provided. Furthermore, a wireless communication device may comprise appropriate connectors (either wired or wireless) to other devices and/or for connecting external accessories, for example hands-free equipment, thereto. The communication devices 502, 504, 505 may access the communication system based on various access techniques.

Figure 6:
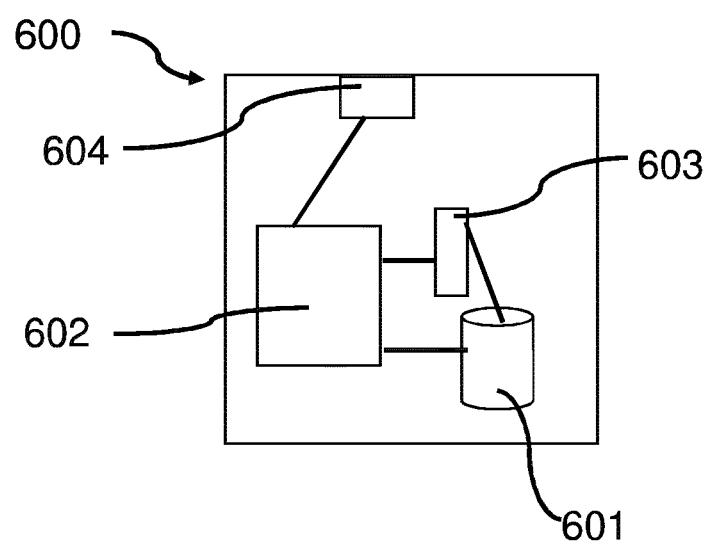
FIG. 6 shows schematic representation of an apparatus according to an example.

FIG. 6 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an IAB or relay node. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 600 can be arranged to provide control on communications in the service area of the system. The control apparatus 600 comprises at least one memory 601, at least one data processing unit 602, 603 and an input/output interface 604. Via the interface the control apparatus can be coupled to a receiver and a transmitter of the base station. The receiver and/or the transmitter may be implemented as a radio front end or a remote radio head. For example, the control apparatus 600 or processor 601 can be configured to execute an appropriate software code to provide the control functions.

Figure 7:
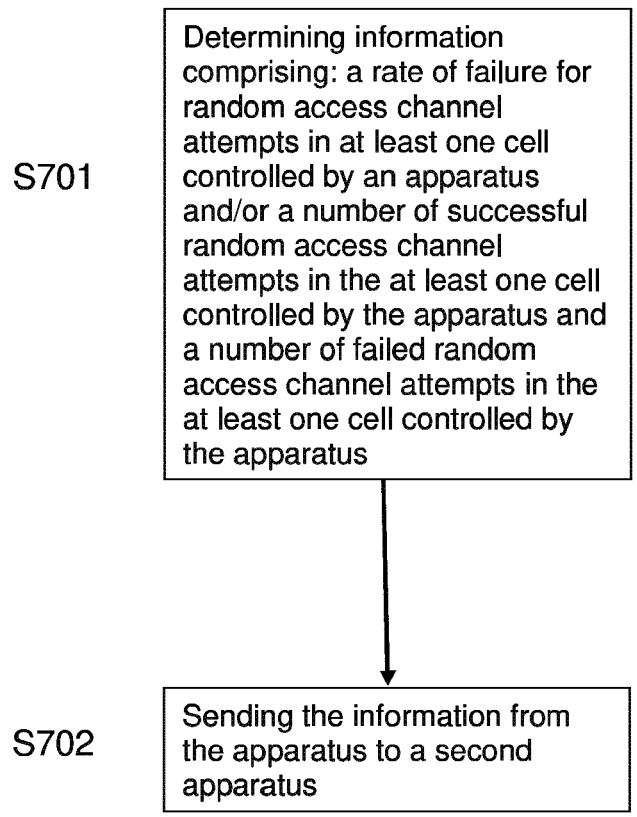
FIG. 7 shows a flow chart of a method.

FIG. 7 is a flow chart of a method according to an example. The flow chart of FIG. 7 is viewed from the perspective of an apparatus such as DU1 311a, for example.

At S701, the method comprises determining information. The information may comprise a rate of failure for random access channel attempts in at least one cell controlled by an apparatus and additionally or alternatively a number of successful random access channel attempts in the at least one cell controlled by the apparatus and a number of failed random access channel attempts in the at least one cell controlled by the apparatus.

At S702, the method comprises sending the information from the apparatus to a second apparatus. The second apparatus may be an apparatus such as CU1 305, for example.

Figure 8:
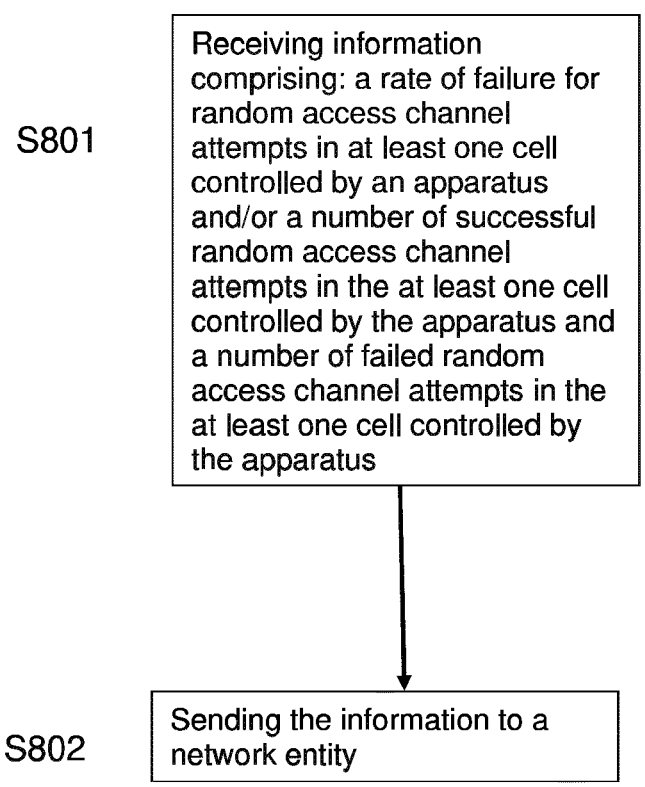
FIG. 8 shows a flow chart of a method.

FIG. 8 is a flow chart of a method according to an example. The flow chart of FIG. 8 is viewed from the perspective of an apparatus such as CU1 305, for example.

At S801, the method comprises receiving information. The information may comprise a rate of failure for random access channel attempts in at least one cell controlled by an apparatus (e.g. DU1 311a) and additionally or alternatively a number of successful random access channel (RACH) attempts in the at least one cell controlled by the apparatus and the number of failed random access channel attempts in the at least one cell controlled by the apparatus.

At S802, the method comprises sending the information to a network entity (e.g. CU2 307, DUk 301c).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
at least one processor; and
at least one memory including computer program code;

the at least one memory and the computer program code configured to, with the at least one processor, cause the apparatus at least to perform:
determining information comprising:
- a rate of failure for random access channel attempts in at least one cell controlled by the apparatus, wherein the rate of failure for random access channel attempts in at least one cell controlled by the apparatus is determined when a number of failed random access channel attempts in the at least one cell controlled by the apparatus exceeds a threshold value, wherein random access channel outcome information is sent when the number of failed random access channel attempts in the at least one cell controlled by the apparatus exceeds the threshold value, wherein the random access channel outcome information comprises information on successful random access channel attempts and information on failed random access channel attempts; and
- a number of successful random access channel attempts in the at least one cell controlled by the apparatus and a number of failed random access channel attempts in the at least one cell controlled by the apparatus, wherein determining the information comprises determining the rate of failure for random access channel attempts in the at least one cell controlled by the apparatus and is based on:
- determining a ratio of failed random access channel attempts in the at least one cell controlled by the apparatus to a total number of random access channel attempts in the at least one cell controlled by the apparatus, wherein the total number of random access channel attempts in the at least one cell controlled by the apparatus is determined as a sum of: the number of failed random access channel attempts in the at least one cell controlled by the apparatus; and the number of successful random access channel attempts in the at least one cell controlled by the apparatus;

sending the information from the apparatus to a second apparatus;

receiving, from the second apparatus, a message comprising the rate of failure for random access channel attempts in at least one other cell;

receiving, from the second apparatus, information of random access channel reports related to random access channel attempts in the at least one cell controlled by the apparatus, wherein the random access channel reports related to random access channel attempts in the at least one cell controlled by the apparatus comprise indexes of synchronization system blocks (SSBs) and a number of random access channel preambles sent on each tried SSB listed in chronological order of attempt; and determining, based on the information of random access channel reports related to random access channel attempts in the at least one cell controlled by the apparatus received from the second apparatus, a value indicating the number of failed random access channel attempts in the at least one cell controlled by the apparatus, wherein the information of random access channel reports related to random access channel attempts in the at least one cell controlled by the apparatus is associated to a User Equipment.

* * * * *